(12) United States Patent
Mori et al.

(10) Patent No.: US 11,318,621 B2
(45) Date of Patent: May 3, 2022

(54) IN-VEHICLE BUILDING MATERIAL PROCESSING SYSTEM AND BUILDING MATERIAL PROCESSING METHOD

(71) Applicant: IIDA GROUP HOLDINGS CO., LTD., Musashino (JP)

(72) Inventors: Kazuhiko Mori, Tokyo (JP); Yoichi Nishikawa, Tokyo (JP); Ayumu Watanabe, Tokyo (JP); Yusuke Minagawa, Tokyo (JP)

(73) Assignee: IIDA GROUP HOLDINGS CO., LTD., Tokyo (JP)

( * ) Notice: Subject to any disclaimer, the term of this patent is extended or adjusted under 35 U.S.C. 154(b) by 324 days.

(21) Appl. No.: 16/492,533

(22) PCT Filed: Mar. 10, 2017

(86) PCT No.: PCT/JP2017/009852
§ 371 (c)(1),
(2) Date: Sep. 9, 2019

(87) PCT Pub. No.: WO2018/163436
PCT Pub. Date: Sep. 13, 2018

(65) Prior Publication Data
US 2020/0391389 A1 Dec. 17, 2020

(51) Int. Cl.
*B25J 11/00* (2006.01)
*B25J 15/00* (2006.01)
(Continued)

(52) U.S. Cl.
CPC ............. *B25J 11/0055* (2013.01); *B25J 5/02* (2013.01); *B25J 9/0096* (2013.01); *B25J 9/1676* (2013.01);
(Continued)

(58) Field of Classification Search
CPC ....... B25J 11/00; B25J 11/005; B25J 11/0055; B25J 5/00; B25J 5/02; B25J 9/00;
(Continued)

(56) References Cited

U.S. PATENT DOCUMENTS 8,606,399 B2 * 12/2013 Williams ................ B27F 7/006
700/245
8,814,177 B1 * 8/2014 Mubuifor ................. B60K 6/46
280/5.514
2016/0177540 A1 * 6/2016 Penza ........................ E02F 3/96
37/347

FOREIGN PATENT DOCUMENTS

JP S62-204315 A 9/1987
JP 2000-350523 A 12/2000
(Continued)

OTHER PUBLICATIONS

May 30, 2017 International Search Report issued in International Patent Application No. PCT/JP2017/009852.

*Primary Examiner* — Khoi H Tran
*Assistant Examiner* — Sarah A Tran
(74) *Attorney, Agent, or Firm* — Oliff PLC

(57) ABSTRACT

An in-vehicle building material processing system including: a flat cargo bed formed on a vehicle; rigid members for ensuring flatness with respect to a workpiece-receiving table formed at predetermined section of the cargo bed; clampers for fixing a building material on the workpiece-receiving table; a multi-joint robot provided with a freely swingable cutting means at its tip, which is capable of protruding in a range wider than outer periphery of the workpiece-receiving table; and a control unit having an operation unit for making the multi-joint robot to cut and process the building material desirably, wherein the control unit controls the cutting means to cut and process the building material while con-
(Continued)

trolling at least either of the cutting means and the clampers to avoid a contact of the cutting means and the clampers.

8 Claims, 14 Drawing Sheets

(51) Int. Cl.
*B25J 5/00* (2006.01)
*B25J 5/02* (2006.01)
*B25J 9/00* (2006.01)
*B25J 9/16* (2006.01)
*B27C 9/02* (2006.01)
*B60P 3/14* (2006.01)
*G05B 19/4155* (2006.01)

(52) U.S. Cl.
CPC ............ *B25J 15/0019* (2013.01); *B60P 3/14* (2013.01); *G05B 19/4155* (2013.01); *B27C 9/02* (2013.01); *G05B 2219/45083* (2013.01)

(58) Field of Classification Search
CPC . B25J 9/16; B25J 9/0096; B25J 9/1674; B25J 9/1676; B25J 15/00; B25J 15/0019; B60P 3/00; B60P 3/14; G05B 19/00; G05B 19/02; G05B 19/18; G05B 19/4155; G05B 2219/45; G05B 2219/45083; B27C 9/00; B27C 9/02
USPC ........................................................ 700/255
See application file for complete search history.

(56) References Cited

FOREIGN PATENT DOCUMENTS

| | | |
|---|---|---|
| JP | 2001-287204 A | 10/2001 |
| JP | 2004-160667 A | 6/2004 |
| JP | 2005-254378 A | 9/2005 |
| JP | 2012-192682 A | 10/2012 |

\* cited by examiner (A)

(B)

IN-VEHICLE BUILDING MATERIAL PROCESSING SYSTEM AND BUILDING MATERIAL PROCESSING METHOD

BACKGROUND OF THE INVENTION

Field of the Invention

Present invention relates to an in-vehicle building material processing system capable of moving to construction site, and capable of cutting and processing a building material to be used on construction site at construction site, and to a building material processing method.

Description of Related Art

A self-advancing various square lumber manufacturing machine capable of carrying wood processing machinery by car for performing wood processing at a place other than factory is known. For example, in D1, a self-advancing various square lumber manufacturing machine, which is convenient by self-motive power and freely transferable without requiring another motive power, is disclosed. In addition, in D2, on-site wood processing machinery (mobile lumbering machine) capable of making a square timber or a board by on-site processing of raw wood lumbered on site is disclosed.

The purpose of the self-advancing various square lumber manufacturing machine of D1 is to reduce overhead expenses involved with lumber production by carrying out on-site processing of small diameter woods, thinned woods and the like which are allowed to left in forest. Concretely, processing small diameter woods, thinned woods and the like on site using wood processing machinery capable of being carried into forest by loading it on a light truck bed, and bringing back worked woods by loading it on the light truck bed with the wood processing machinery. Also, a motive power of the wood processing machinery is obtained via a V-belt pulley, which rotates coaxially with a rear wheel of a light truck.

The on-site wood processing machinery (mobile lumbering machine) of D2 is having following features. In other words, it is an assembling type mobile wood processing machinery comprising: a raw wood mounting base having a pantograph type lifting function for mounting a raw wood thereon; a raw wood holding/moving part for supporting a raw wood rotating/holding part including a rotating function for holding both end faces of the raw wood; a rail for arranging the raw wood mounting base and the raw wood holding/moving part thereon to be movable; and a raw wood cutting cutter.

In this mobile wood processing machinery, parts for holding both end faces of the raw wood are chuck plates having chuck pins, and the raw wood is fixed by pressing chuck pins attached to a chuck plate against both end faces of the raw wood by performing centering by using a centering mechanism and moving the raw wood holding/moving part on the rail. Further, in this mobile wood processing machinery, the raw wood is cut in longitudinal direction by the cutter to make a square timber or a board by using a wheel having a plurality of rotating angle adjusting holes and a rotating angle adjusting mechanism having a positioning pin.

Patent Literature 1: JP 2001-287204 A
Patent Literature 2: JP 2012-192682 A

SUMMARY OF THE INVENTION

However, the self-advancing various square lumber manufacturing machine of D1 and the mobile wood processing machinery of D2 are in-vehicle portable type wood processing machinery for processing woods obtained in forest on site, and they were not a machine for bringing building materials to a construction site of a house or the like and for processing the building materials to be consumed on site to a state just before fitting.

In other words, they were not a machine for semi-automating a processing of building materials on construction site, normally semi-automatically worked in wood processing factory or performed by manual work of skilled worker on site. On the other hand, constituent of workers working on construction site has been changed according to change of social condition, and highly skilled workers tend to decrease and skill level tends to decrease in average.

Therefore, in-vehicle building material processing system and building material processing method capable of processing building materials easily on construction site, even there is no or only few skilled workers, have been required.

The present invention has been invented considering the above problem, and the purpose of the present invention is to provide a building material processing system and a building material processing method capable of cutting and processing building materials easily on construction site, not in factory, even there is no or only few skilled workers, and especially, capable of cutting and processing building materials without attention for malfunction that a cutting means contacts a clamper to damage each other.

The invention describes a movable in-vehicle building material processing system (100, 101, and 103) having a function to cut and process a building material (1) to be used on construction site, comprising:

a flat cargo bed (60) formed on a vehicle (90, 99);

rigid members (65, 66) for ensuring flatness with respect to a workpiece-receiving table (50, 59) formed at predetermined section of the cargo bed (60);

clampers (11 to 18, 5 to 8) for fixing the building material (1) on the workpiece-receiving table (50, 59) with control;

a multi joint robot (40) provided with a freely swingable cutting means (30) at its tip, which is capable of protruding in a range wider than outer periphery (51 to 54) of the workpiece-receiving table (50, 59); and a control unit (80) for controlling entire system having an operation unit (70) for making the multi joint robot (40) to cut and process the building material (1) desirably, wherein the control unit (80) controls the cutting means (30) to cut and process the building material (1) while controlling at least either of the cutting means (30) and the clampers (11 to 18, 5 to 8) to avoid contact of the cutting means (30) and the clampers (11 to 18, 5 to 8).

In addition, the invention describes the in-vehicle building material processing system (103), wherein the clampers (11 to 14, 5 to 8) comprise a pressing crossarm (47) having avoiding function, which is at least either capable of operating to rotate around a vertical axis (48) or capable of moving in horizontal direction, with respect to the workpiece-receiving table (59) by control of the control unit (80), in order to avoid contact of the cutting means (30) and the clampers (11 to 14, 5 to 8).

In addition, the invention describes the in-vehicle building material processing system (103), wherein the control unit (80) comprises:

a mutual position relation predicting means (81) for predicting mutual position relation between the cutting means (30) and the clampers (11 to 14, 5 to 8); and a clamper avoiding means (82) for operating only clamper, which is predicted to contact the cutting means (30), to avoid the cutting means (30), among the clampers (11 to 14, 5 to 8) plurally arranged on the workpiece-receiving table (59), and also, for operating the clamper to return to be able to fix the building material (1), from the clamper that avoiding purpose has been ended, based on a calculation result of the mutual position relation predicting means (81).

In addition, the invention describes the in-vehicle building material processing system (100, 101, and 103), wherein a total number N of the clampers (11 to 18, 5 to 8) is N=8.

In addition, the invention describes the in-vehicle building material processing system (100, 101, and 103), further comprising:

an air cylinder (49) for driving open and close operation or moving operation of the clampers (11 to 18, 5 to 8);

an air compressor (93) for applying compressed air to the air cylinder (49); and an electromagnetic air valve (71) capable of controlling to press the compressed air generated by the air compressor (93) into the air cylinder (49) based on an operation of the operation unit (70).

In addition, the invention describes the in-vehicle building material processing system (100, 101, and 103), further comprising:

rails (62) extending in adjacent to the workpiece-receiving table (50, 59); and a carrier (64) capable of moving the multi joint robot (40) by engaging with the rails (62), wherein the control unit (80) is configured to control the cutting means (30) and the multi-joint robot (40) together with the carrier (64).

In addition, the invention describes the in-vehicle building material processing system (100, 101, and 103), wherein the vehicle (90, 99) comprises:

a power generator (91, 94) capable of supplying electric power necessary for the system; and a dust collector (92) for collecting cutting chips, wherein the power generator (91, 94) and the air compressor (93) are loaded at forward side of the cargo bed (60) and in front of the workpiece-receiving table (50, 59), the workpiece-receiving table (50, 59) is formed at intermediate position of longitudinal direction of the cargo bed (60), and a storage place (10) for material before processing is arranged at backward side of the cargo bed (60).

In addition, the invention describes the in-vehicle building material processing system (100, 101, and 103), wherein the power generator (91, 94) comprises a power transmission means (95) driven by concurrently using a power of engine (96) used for a movement of the vehicle (99).

In addition, the invention describes a building material processing method for cutting and processing a building material (1) to be used on construction site by loading a multi joint robot (40) provided with a freely swingable cutting means (30) at its tip onto a vehicle, using:

a workpiece-receiving table (50, 59) ensuring flatness by rigid members (65, 66) arranged at predetermined section of a cargo bed (60) composing a vehicle (90, 99);

a multi joint robot (40) provided with a freely swingable cutting means (30) at its tip, which is capable of protruding in a range wider than outer periphery (51 to 54) of the workpiece-receiving table (50, 59); and a control unit (80) for controlling entire system having an operation unit (70) for making the multi joint robot (40) to cut and process the building material (1) desirably, wherein the building material (1) fixed on the workpiece-receiving table (50, 59) by clampers (11 to 18, 5 to 8) is cut and processed by the cutting means (30) while at least either of the cutting means (30) and the clampers (11 to 18, 5 to 8) is operated to avoid a contact of the cutting means (30) and the clampers (11 to 18, 5 to 8), with an aid of the control unit (80).

In addition, the invention describes the building material processing method comprising:

a material loading step (S10) for loading building materials (1) before processing and to be used on construction site onto a storage place (10) for material before processing arranged at backward side of the cargo bed (60);

a self-advancing moving step (S20) for moving the vehicle (90, 99) in fully equipped condition to construction site by self-travelling;

a building material clamping step (S30) for fixing loaded building material (1) before processing by the clampers (11 to 14, 5 to 8), by moving the building material (1) to the workpiece-receiving table (59) in an order of use for assembly;

a desired operation step (S40), in which a user operates the operation unit (70) for performing a desired cutting and processing of the building material (1) by the multi-joint robot (40);

a cutting and processing step (S50) for cutting and processing the building material (1) by the cutting means (30) while the clampers (11 to 14, 5 to 8) operating to avoid a contact with the cutting means (30), by controlling an entire system by the control unit (80) according to an operation of the user; and a building material clamping releasing step (S60) for removing the building material (1) cut and processed desirably from the workpiece-receiving table (59) by releasing the clampers (11 to 14, 5 to 8).

In addition, the invention describes the building material processing method, wherein the cutting and processing step (S50) comprises:

a mutual position relation predicting step (S51) for predicting mutual position relation between the cutting means (30) and the clampers (11 to 14, 5 to 8) by a mutual position relation predicting means (81), based on a behavior of the cutting means (30) according to the desired cutting and processing;

a contact avoiding step (S52) for operating a clamper, which is predicted to contact the cutting means (30), to avoid the cutting means (30), among a plurality of the clampers (11 to 14, 5 to 8), according to a prediction result by the mutual position relation predicting step (S51); and a clamper returning step (S53) for operating the clamper, which has been operated to avoid the cutting means (30) in the contact avoiding step (S52), to return to be able to fix the building material (1), from the clamper that avoiding purpose has been ended.

As explained in the above, according to the present invention, it is possible to provide a building material processing system and a building material processing method capable of cutting and processing the building material easily on construction site, not in factory, even there is no or only few skilled workers, and especially, capable of cutting and processing without attention for malfunction that a cutting means contacts a clamper to damage each other.

BRIEF DESCRIPTION OF THE DRAWINGS

FIG. 9A is a plan view illustrating a state before avoidance, and FIG. 9B is a plan view illustrating a state during avoidance.

FIG. 12A is a schematic plan view illustrating a building material clamping step (FIG. 14), and FIG. 12B is a schematic plan view illustrating a beginning of a cutting and processing step (FIG. 14), and FIG. 12C is a schematic plan view illustrating an end of a cutting and processing step (FIG. 14).

DETAILED DESCRIPTION OF THE INVENTION

In below, the preferred embodiments of the present invention are explained in detail. In addition, these embodiments explained in below are not intended to unjustly limit the content of the present invention described in claims, and it is not limited that all features explained in these embodiments are necessary as means for solving the problem of the present invention. At first, explaining about this system of always in-vehicle type using FIGS. 1 to 6, and then, explaining about a modified example of ground installed type, in which the processing unit is used by unloading from the cargo bed of the vehicle, using FIGS. 7 to 12.

Always In-Vehicle Type

Figure 1:
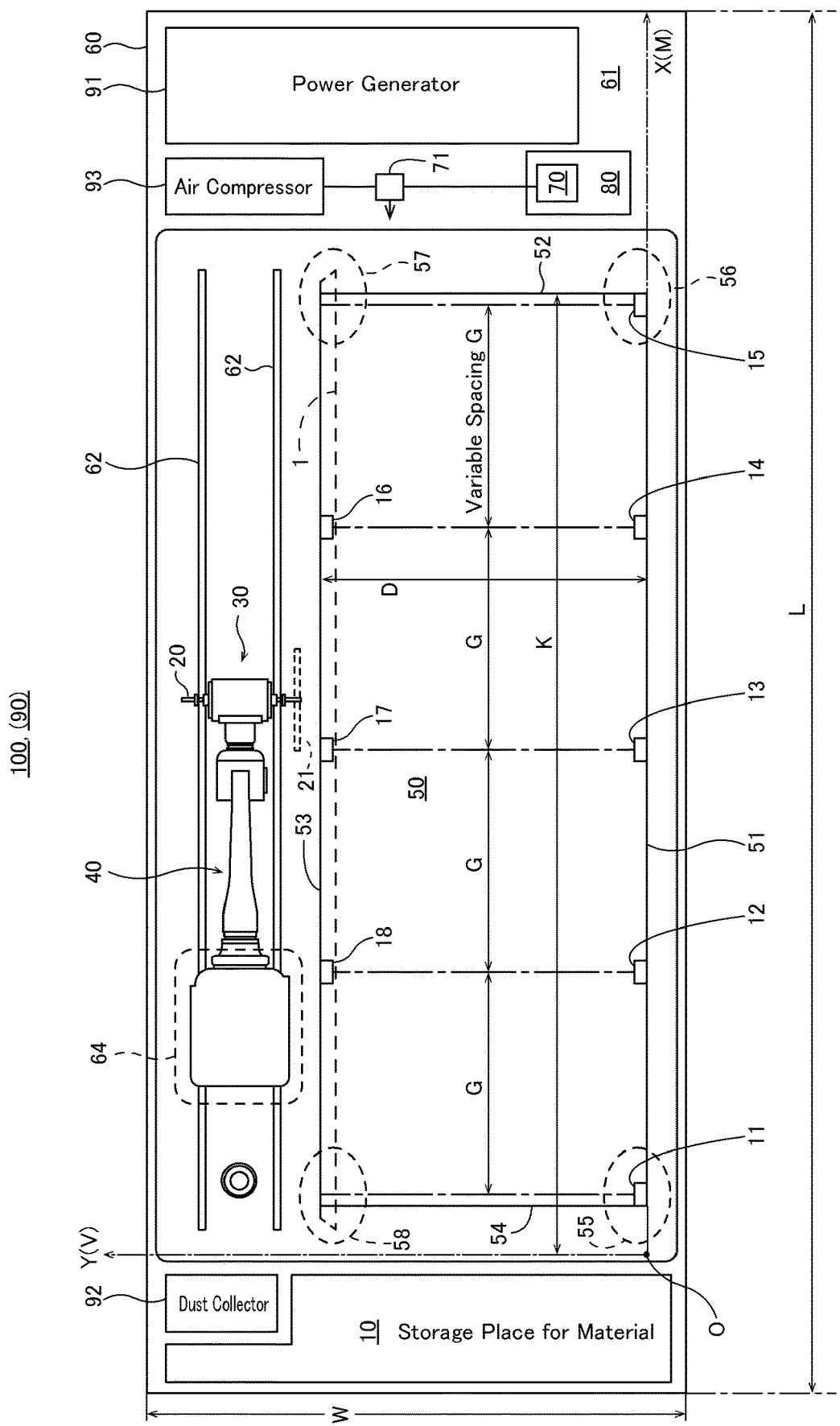
FIG. 1 is a plan view schematically illustrating a main part of an in-vehicle building material processing system relating to one embodiment of the present invention (hereinafter, referred to as "this system").
Figure 2:
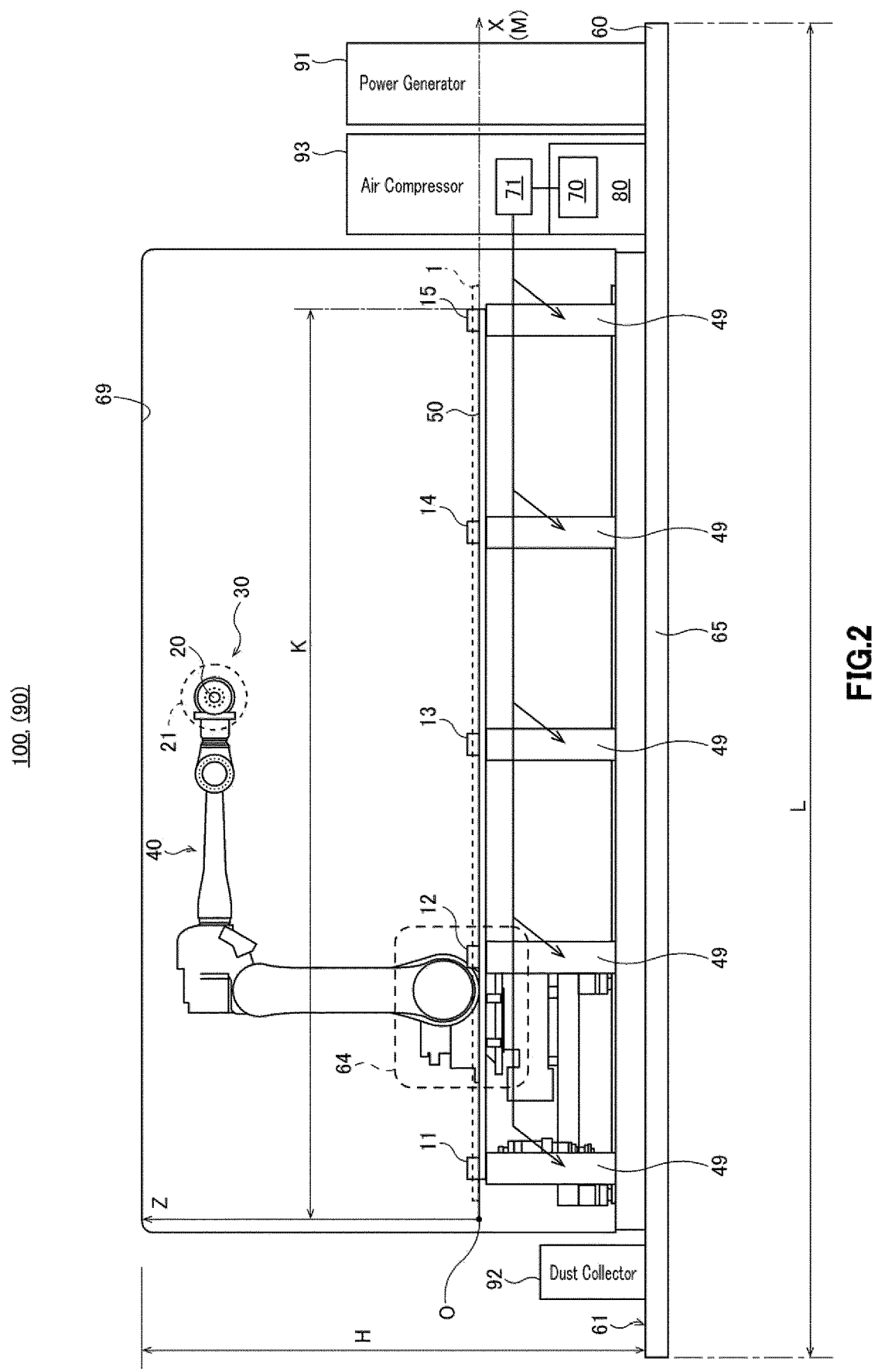
FIG. 2 is a side view schematically illustrating a main part of this system.
Figure 3:
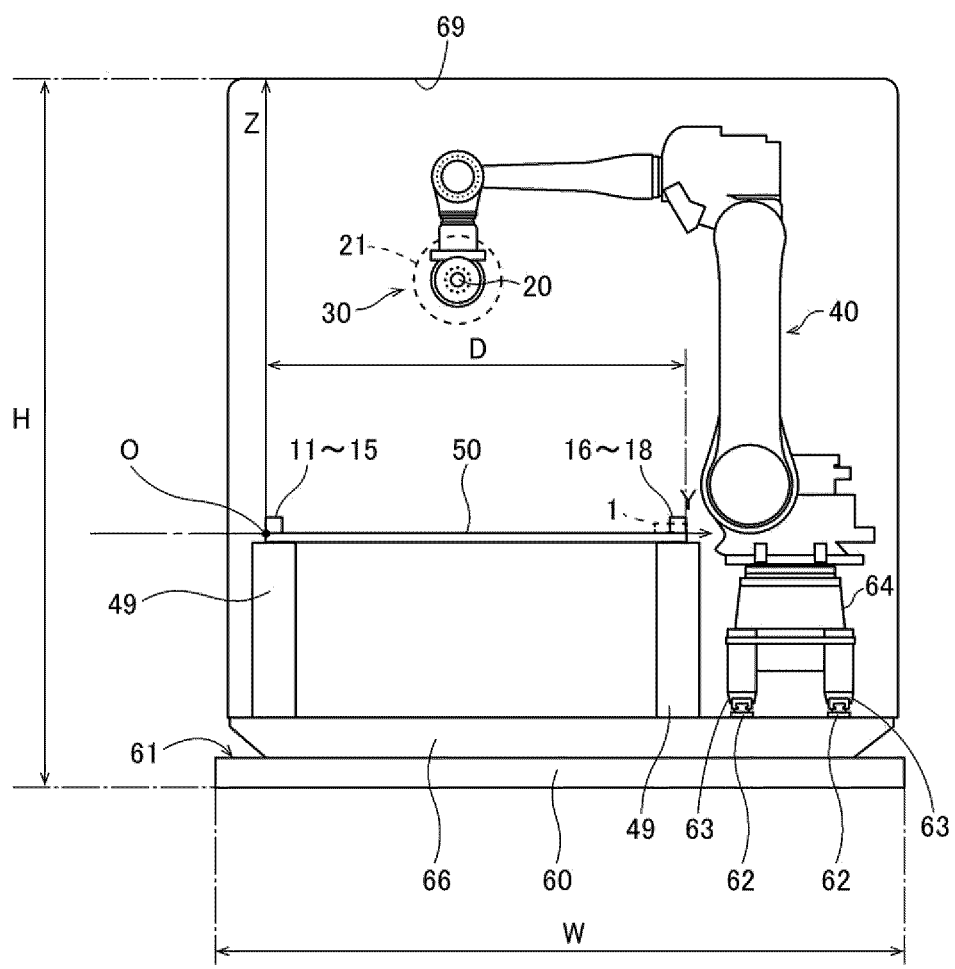
FIG. 3 is a front view schematically illustrating a main part of this system.
Figure 4:
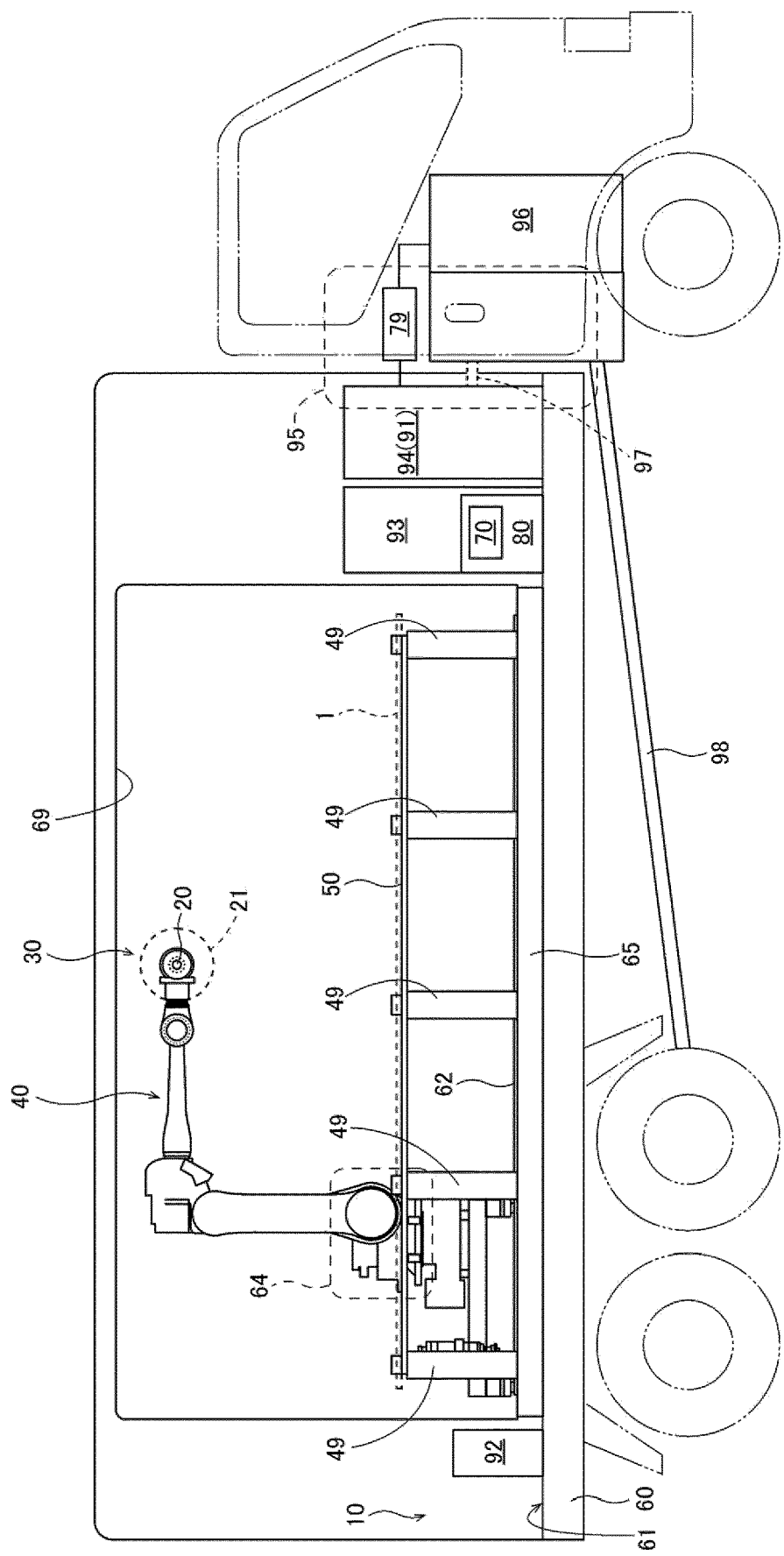
FIG. 4 is a side view illustrating this system more practically.

FIGS. 1 to 3 are schematic views of a main part of this system, and FIG. 1 is illustrating a plan view, FIG. 2 is illustrating a side view, and FIG. 3 is illustrating a front view, respectively. FIG. 4 is a side view illustrating this system more practically. This system 100 (hereinafter, 101 may be included) is a system in which a device for cutting and processing a building material 1 to be used on construction site is made to be movable by loading the device on a vehicle 90 (hereinafter, 99 may be included). In addition, the vehicle 90 is a remodeled vehicle using an existing truck, and the vehicle 99 is a specially equipped vehicle designed and manufactured exclusively for this system 101.

This system 100 is made to be movable by loading a device having similar function as Machining Center onto a vehicle. The machining center is defined as "numerically controlled (NC) machine tool for performing various processing respectively on more than 2 surfaces of a worked object (workpiece) without changing the worked object" by JIS (JIS B0105).

On the other hand, this system 100 is a processing machine exclusive for building materials, and processes a square timber or a board larger than a workpiece, which is an object for processing in a metal processing machine. In addition, other than wood material, plasterboard or the like can be cut and processed into optional shape on construction site. In addition, this system 100 is not equipped with an automatic exchanging function or an automatic selecting function of a tool (rotating blade), but it is fine whether the above function is included or not.

A movable vehicle 90 (99) composing this system 100 (101) exemplified in FIG. 4 is a vehicle capable of self-travelling as it is equipped with driving force as well as known single truck. However, it is not limited to the above configuration, and this system 100 may be configured based on trailing truck (trailer) towed by unillustrated traction vehicle.

This system 100 is configured to comprise a cargo bed 60, a rigid member 65 (FIGS. 2 and 4), a rigid member 66 (FIG. 3), a workpiece-receiving table 50, clampers 11 to 18 (FIG. 1), a multi joint robot 40, and a control unit 80 (FIGS. 1 and 2). The cargo bed 60 is a flat surface formed on the vehicle 90 (99). At backward side of the cargo bed 60, a storage place 10 for material before processing is arranged. The rigid member 65 is a metal frame in longitudinal direction coinciding to advancing direction of the vehicle 90 (99), and the rigid member 66 being perpendicular to the rigid member 65 is a metal frame in width direction.

The workpiece-receiving table 50 is formed in predetermined section of the flat cargo bed 60 with strong support of the rigid members 65 and 66. As a result, the workpiece-receiving table 50 is ensuring precise flatness at intermediate position of longitudinal direction of the cargo bed 60. This workpiece-receiving table 50 is, for example, having a length K of 50% to 90% with respect to entire length L of the cargo bed 60, and also, for example, having a width D of 50% to 90% with respect to entire width W of the cargo bed 60. The clampers 11 to 18 fix the building material 1 on the workpiece-receiving table 50.

The maximum size (mm) of each material of the building materials 1 is as exemplified in below. In this system 100, it is possible to cut and process plasterboard (for example, 9·12×910×2730), flooring (for example, 303×1818), baseboard (for example, 77×4000), wall trim (for example, 55×4000), frame or attached frame (for example, 120×1950×70), structural plywood (for example, 9·12×910×2440), for example, 2×4 material (38×89), 2×6 material (38×140), 2×8 material (38×184), 2×10 material (38×235) or the like.

In addition, a timber for two by four method is defined in JAS (Japanese Agricultural Standard), and a timber with prescribed size specified by the following names will be used. In other words, it includes a timber indicated as 1×4 (for example, 19×89 with desiccant), 1×6, 2×2, 2×3, 2×4

(204 material), 2×6 (206 material), 2×8, 2×10 (210 material), 2×12, 4×4 (404 material) with different sectional shape. In addition, names derive from inch size, but actual sizes are smaller than the cited inch size. In addition, it is often sold by integrating specified lengths into about five types, for example 910, 1820, 2336, 3040, and 3650 mm, according to each demand.

Figure 5:
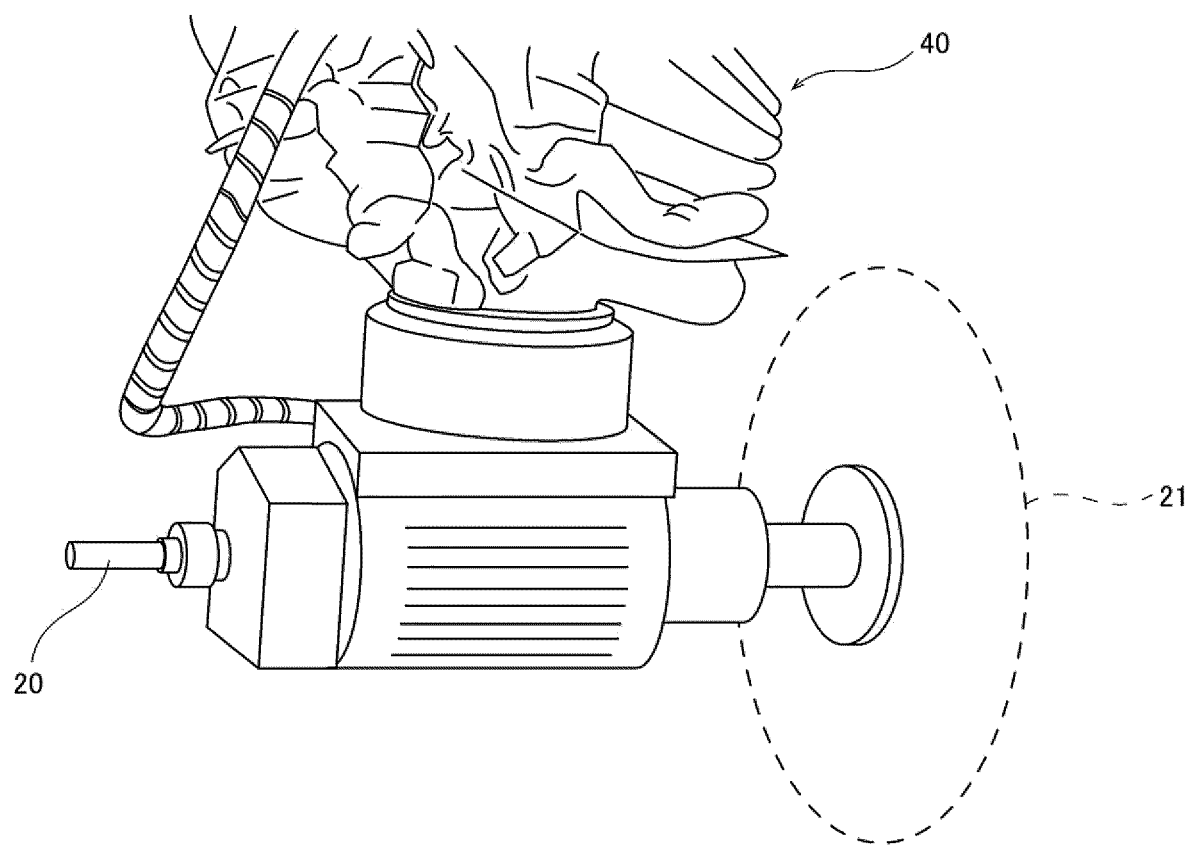
FIG. 5 is a perspective view illustrating a cutting means of this system more practically.

FIG. 5 is a perspective view illustrating a cutting means of this system more practically. As illustrated in FIG. 5, a multi joint robot 40 is provided with a freely swingable cutting means 30 at its tip. The cutting means 30 is configured as an exchangeable rotating blade by mounting a circular saw 21 or unillustrated drill (router) on a rotation axis 20, and capable of operating cutting and processing by protruding in a range wider than outer periphery 51 to 54 of the workpiece-receiving table 50. A control unit 80 controls unillustrated servomotor by numerical control, and controls open and close of an electromagnetic air valve 71, and also, integrally controls entire system.

The servomotor enables necessary operation for cutting and processing by bending and stretching each joint of multi joint robot 40 accordingly, and by supporting the rotation axis 20 of the cutting means 30 in appropriate angle with respect to the building material 1 fixed to the workpiece-receiving table 50, and also, by moving the cutting means 30 along cutting direction. In addition, the multi joint robot 40 is capable of self-advancing on rails 62 by the servomotor, so it is configured to easily operate the cutting means 30 over wide range of the workpiece-receiving table 50.

In this system 100, 101 (FIG. 4), 103 (FIGS. 7 to 12), the control unit 80 controls the cutting means 30 to cut and process the building material 1 while controlling at least either of the cutting means 30 and the clampers 11 to 18, 5 to 8 to avoid contact of the cutting means 30 and the clampers 11 to 18, 5 to 8. The control unit 80 comprises an operation unit (robot control panel) 70, unillustrated computer, and storage means storing a program, which can be executed accordingly by this computer.

In other words, this control unit 80 is having a control function for cutting and processing the building material 1 desirably by the multi joint robot 40 based on a programmed processing specification according to an instruction from the operation unit 70 by the user. In addition, the control unit 80 is configured to accept an instruction from unillustrated tablet PC or laptop computer as the operation unit 70.

In addition, in this system 100, 101, the control unit 80 controls the multi joint robot 40 to cut and process the building material 1 such that the cutting means 30 will avoid a position of the clampers 11 to 18 based on a program. In addition, when the clampers 11 to 18 are the type, which cannot be moved in horizontal direction with respect to the workpiece-receiving table 50, it is possible to control the cutting means 30 to perform an operation for avoiding collision or to stop accordingly.

However, there is a case that it is possible to avoid contact of the clampers 11 to 18 and the cutting means 30 only by operating a clamper, which is predicted to contact the cutting means 30 among the clampers 11 to 18, to open. Further, as mentioned in the below, in this system 103 (FIGS. 7 to 12) with higher practicality, the control unit 80 is capable of controlling the entire system to control the cutting means 30 to cut and process the building material 1, while operating the clampers 11 to 14, 5 to 8 to avoid contact with the cutting means 30, based on a program. In addition, about the clampers 11 to 18, 5 to 8, it will be described in more detail in the below.

X axis coincides with a longitudinal direction of the cargo bed 60 and having a length M, for example equal to or less than 100% with respect to entire length L of the cargo bed 60. Y axis coincides with a width direction of the cargo bed 60 and having a length V, for example equal to or less than 120% with respect to entire width W of the cargo bed 60. Z axis coincides with a height direction of the cargo bed 60 and having a height H from a floor 61 to a ceiling 69 of the cargo bed 60.

As mentioned above, this system 100 is having a function similar to a machining center, and a range that the multi joint robot 40 can cut and process is set by three-dimensional coordinate of X axis, Y axis and Z axis based on a reference point O of the workpiece-receiving table 50. The control unit 80 controls unillustrated servomotor by numerical control, based on respective coordinate value of these X axis, Y axis and Z axis. Therefore, this system 100 cuts and processes the building material 1 fixed to the workpiece-receiving table 50 in the range of X axis, Y axis and Z axis by the cutting means 30 of the multi joint robot 40.

Figure 6:
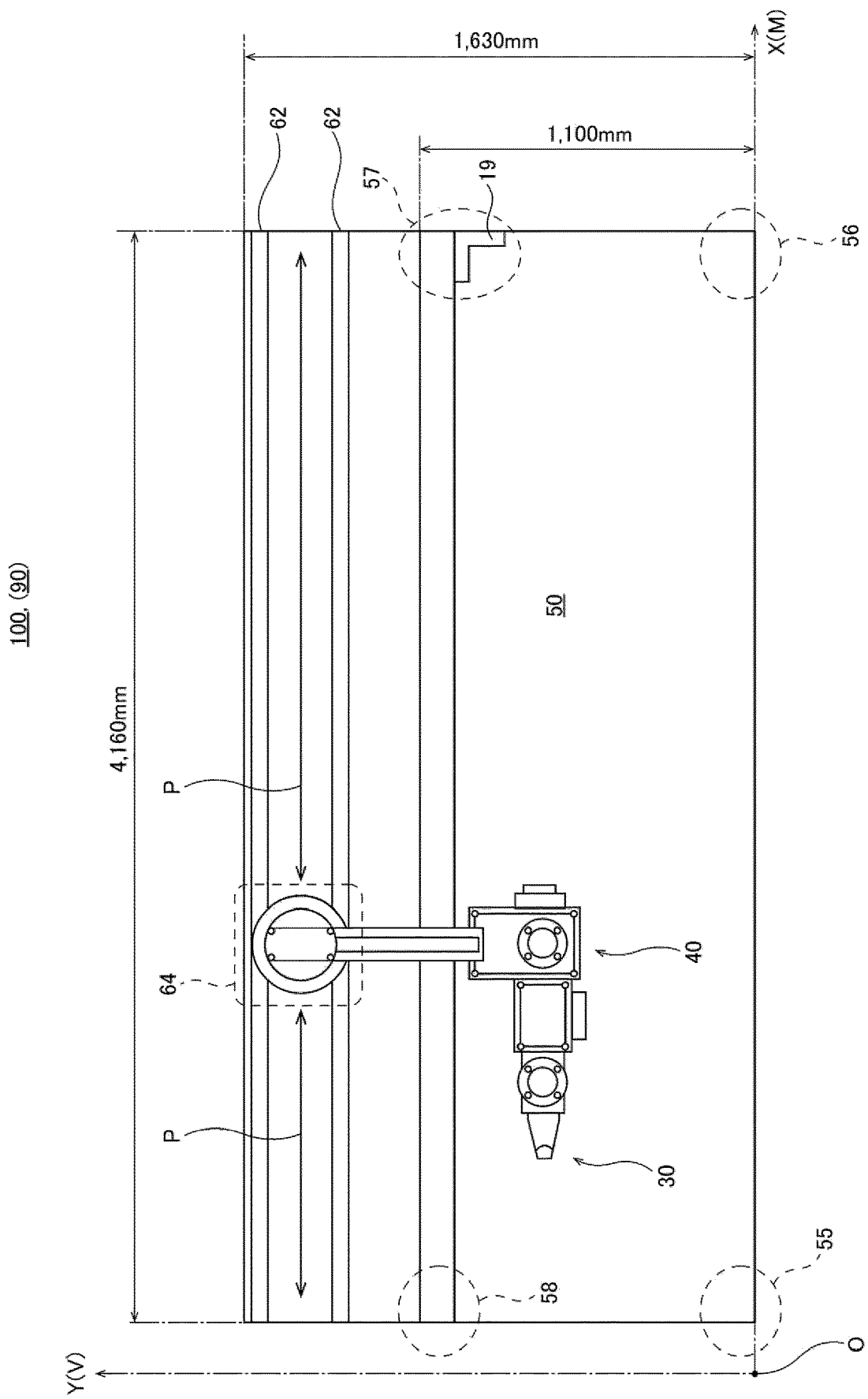
FIG. 6 is a plan view of this system illustrating a similar embodiment of FIG. 1.

FIG. 6 is a plan view of this system illustrating a similar embodiment of FIG. 1. In FIG. 6, it is abbreviating the explanation by giving an identical reference number to a member or part with identical effect, as function and operation of these members are similar with each other, even an embodiment of FIG. 6 is little different compared to an embodiment indicated in FIG. 1. Further, this system comprises rails 62 and a carrier 64.

The rails 62 extend in X axis direction adjacent to the workpiece-receiving table 50, and form self-advancing lane for the carrier 64. The carrier 64 comprises unillustrated servomotor controlled by the control unit 80, and capable of moving the multi joint robot 40 in X axis direction by engaging with the rails 62. The control unit 80 controls the multi joint robot 40 together with the carrier 64. In FIG. 6, a size (mm) of the workpiece-receiving table 50 in a plan view is indicated, for example as 4,160×1,100 (without using cushion 19).

On the other hands, as mentioned above, the maximum size (mm) of each material of the building materials 1 is as follows: in a long material, baseboard is (for example, 77×4,000), in a flat board, plasterboard is (for example, 9·12×910×2730), as a timber for two by four method, for example 4×4 (404) material is (89×89×3650) for structural material beyond building material, and they can be placed on the workpiece-receiving table 50 with some space, and can be cut and processed. In addition, it goes without saying that a standard size of each member is different according to a region to perform this invention.

In addition, among corners 55 to 58 of the workpiece-receiving table 50, the cushion 19 is arranged at a corner 57 and contributes to positioning of the building material 1. In addition, the reference point O is set at lower left in FIGS. 1 and 6. Further, the building material 1 is fixed on the workpiece-receiving table 50 by the clampers 11 to 18, but about this, it is explained in more detail in the below.

In addition, in the vehicle 90 (99) of this system 100 (101), the power generator 94 (91) and the air compressor 93 are provided and loaded at forward side of the cargo bed 60 in front of the workpiece-receiving table 50, and the dust collector 92 is provided and loaded at backward side of the cargo bed 60 in rear of the workpiece-receiving table 50, and configured to assist cutting and processing. The power generator 94 (91) is capable of supplying electric power necessary for this system 100 (101).

In addition, an exclusive vehicle 99 for configuring this system 101 additionally comprises the power transmission means 95 having a power generator drive shaft 97 and a governor 79. An engine 96 of the vehicle 99 drives the vehicle 99 by a vehicle drive shaft 98, and also, transmits its power to the power generator drive shaft 97 by the power transmission means 95, and also capable of driving power generator 94 via the power generator drive shaft 97.

The governor 79 adjusts a rotational speed of the power generator 94 to be constant. By an instruction of this governor 79, an output of the engine 96 is adjusted. In other words, when the rotational speed of the power generator 94 is likely to be decreased for heavy load according to the operation of this system 101, the governor 79 maintains the rotational speed of the power generator 94 by enhancing the output by increasing the amount of fuel supply, for example, by opening a throttle of the engine 96. In addition, in an inverse case, the governor 79 adjusts the engine 96 to decrease the output by reducing the amount of fuel supply.

The exclusive vehicle 99 is capable of using the power of the engine 96 not only for travelling movement of the vehicle 99, but also for driving force of the power generator 94. Therefore, this vehicle 99 can omit an exclusive engine for driving the power generator 94, so facility efficiency will be improved. In addition, even in the exclusive vehicle 99, a standard power generator 91 with engine may be loaded. In this case, the power transmission means 95 having the power generator drive shaft 97 is not necessary.

The air compressor 93 applies a compressed air into an air cylinder 49 for the clampers via an electromagnetic air valve 71 (FIGS. 1 and 2). The electromagnetic air valve 71 is capable of valve control for opening and closing the valve, based on a control signal outputted from the control unit 80 or an operation of the operation unit 70. According to open and close of the electromagnetic valve 71, the compressed air generated in the air compressor 93 will be pressed into or discharged from the air cylinder 49 for the clampers. In addition, instead of the air cylinder 49 for the clampers, a hydraulic driving means, an electrically powered driving means, or the like may be used. In addition, the air cylinder 49 of FIGS. 2 to 4 is illustrated schematically, and actually, it is having much more complicated and precise mechanism, but about this point, illustration and explanation is omitted.

As the above, the air cylinder 49 drives open and close operation of the clampers 11 to 18 by performing a linear operation of predetermined stroke, by distinction of the pressing-in and discharge of the compressed air. As a result, the clampers 11 to 18 can be operated to fix or release the building material 1 selectively with respect to the workpiece-receiving table 50. The dust collector 92 collects the cutting chips generated by cutting and processing of the building material 1 by the cutting means 30 of the multi-joint robot 40.

Fixed Position Clamper

The workpiece-receiving table 50 of this system 100 comprises a total number N of clampers 11 to 18, which are fixed position type that will not move in horizontal direction with respect to the workpiece-receiving table 50. Among these total number N of clampers 11 to 18, (N/2)+1 of clampers are arranged at one side 51 of two sides 51 and 53 being parallel in longitudinal (X axis) direction among outer periphery 51 to 54 of the workpiece-receiving table 50 to divide the one side 51 by variable spacing G. In addition, N is an optional natural number equal to or more than four. In the clampers 11 to 18 illustrated in here, the total umber N=8. In this case, at one side 51, (8/2)+1=5 clampers 11 to 15 are arranged.

In addition, among these total number N of clampers 11 to 18, (N/2)−1 of clampers are arranged at other side 53 of two sides 51 and 53 being parallel in longitudinal (X axis) direction among outer periphery 51 to 54 of the workpiece-receiving table 50 to divide the other side 53 by variable spacing G. As total number N=8, at the other side 53 illustrated in here, (8/2)−1=3 clampers 16 to 18 are arranged. In addition, at corners 57 and 58 of the workpiece-receiving table 50 corresponding to both ends of the other side 53, the clampers 11 to 18 are not arranged.

Here, even for a processing specification for cutting an end portion of the building material 1 of a long material by "two by four material" and else, the clampers 11 to 18 engaging with the cutting surface does not exist. Further, even for a processing specification for diagonally cutting the end portion of the building material 1 of the long material, it will be in a position relation such that an extended line of the cutting surface will be protruded and released from the sides 51 to 54 of outer periphery of the workpiece-receiving table 50. In this case, it is possible to achieve desired processing specification by the cutting operation of the cutting means 30 protruding from sides 51 to 54 of outer periphery of the workpiece-receiving table 50.

In addition, when the building material 1 of the long material is mounted near one side 51 in the workpiece-receiving table 50, the clampers 11 and 15 are respectively arranged at its corners 55 and 56, so the cutting means 30 will operate to avoid the clampers 11 and 15. Therefore, it is not possible to cut and process the ends of the building material 1 of the long material. On the other hand, when the building material 1 of the long material is mounted near other side 53 in the workpiece-receiving table 50, in which the clampers 11 to 18 are not arranged at its corners 57 and 58, it is not prevented to cut and process the parts corresponding to its corners 57 and 58. Further, even for a building material 1 with wide size to the extent to occupy the entire surface of the workpiece-receiving table 50 formed at predetermined section of the cargo bed 60, it is possible to cut and process in a longitudinal direction without obstruction by the clampers 11 to 18.

As the above, as the clampers 11 to 18 are not arranged at the corners 57 and 58 of the other side 53 of the workpiece-receiving table 50, it is not prevented to cut and process the parts of the building material 1 corresponding to its corners 57 and 58. In other words, even for the building material 1 of the long material, it can be fixed to use until a limit of a longitudinal direction of the workpiece-receiving table 50. As a result, according to this system 100, it is possible to cut and process longer building material 1. Therefore, even for an in-vehicle device with severe limitation of space, it is possible to use its limited space efficiently.

Moving Clamper

Figure 7:
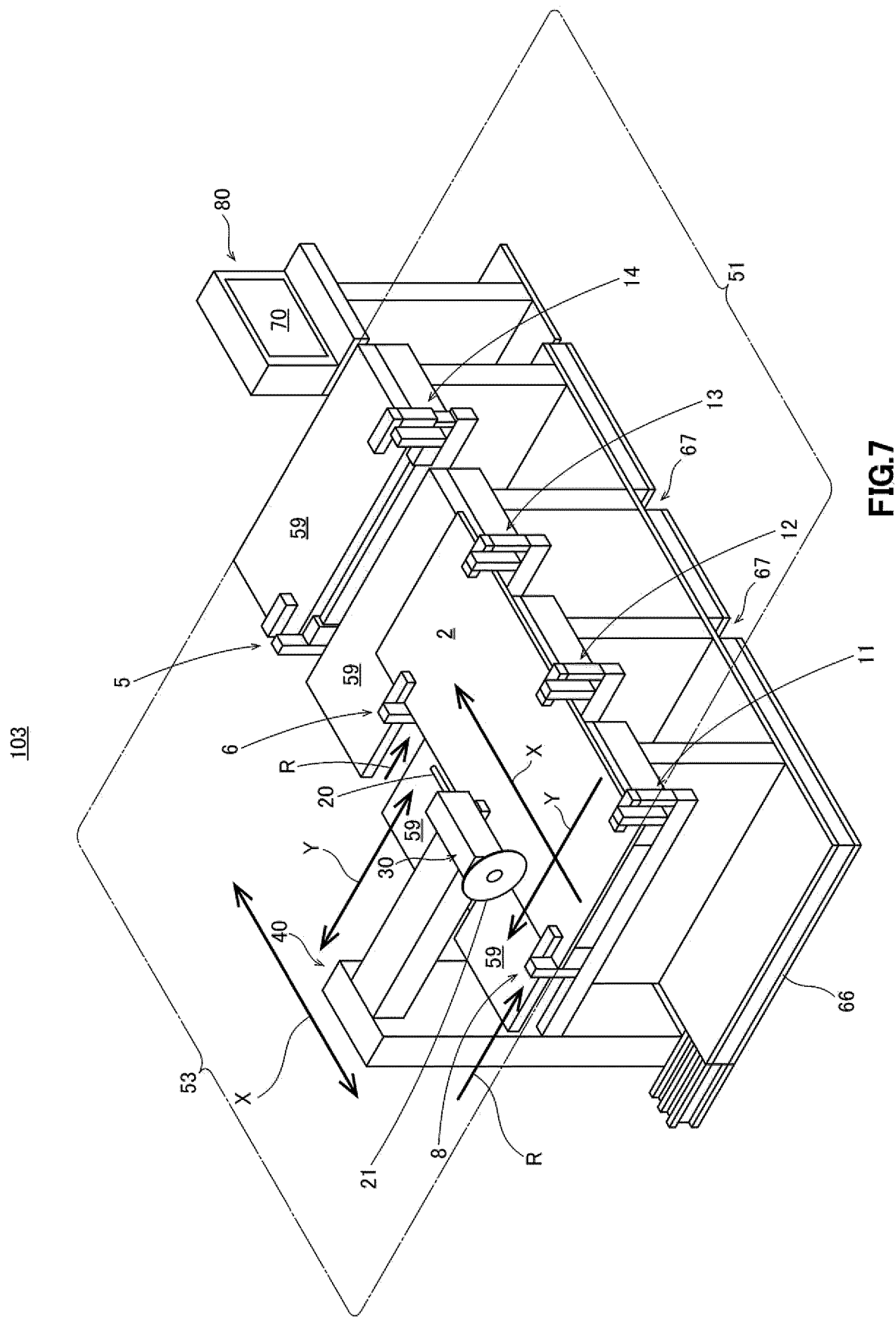
FIG. 7 is a perspective view illustrating a modified example of this system capable of operating clampers to avoid collision.
Figure 8:
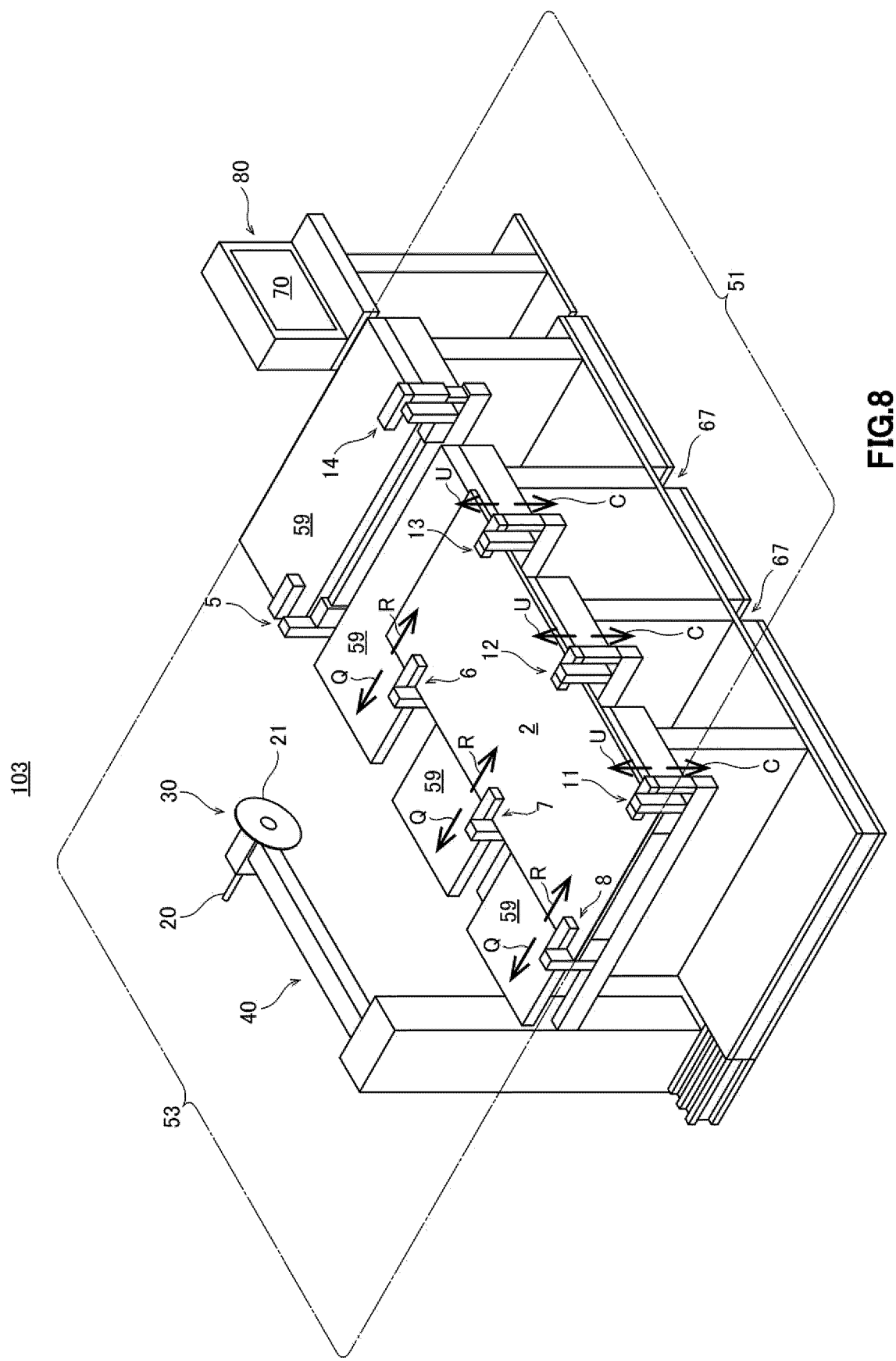
FIG. 8 is a perspective view for explaining an operation of clampers of FIG. 7.
Figure 9:
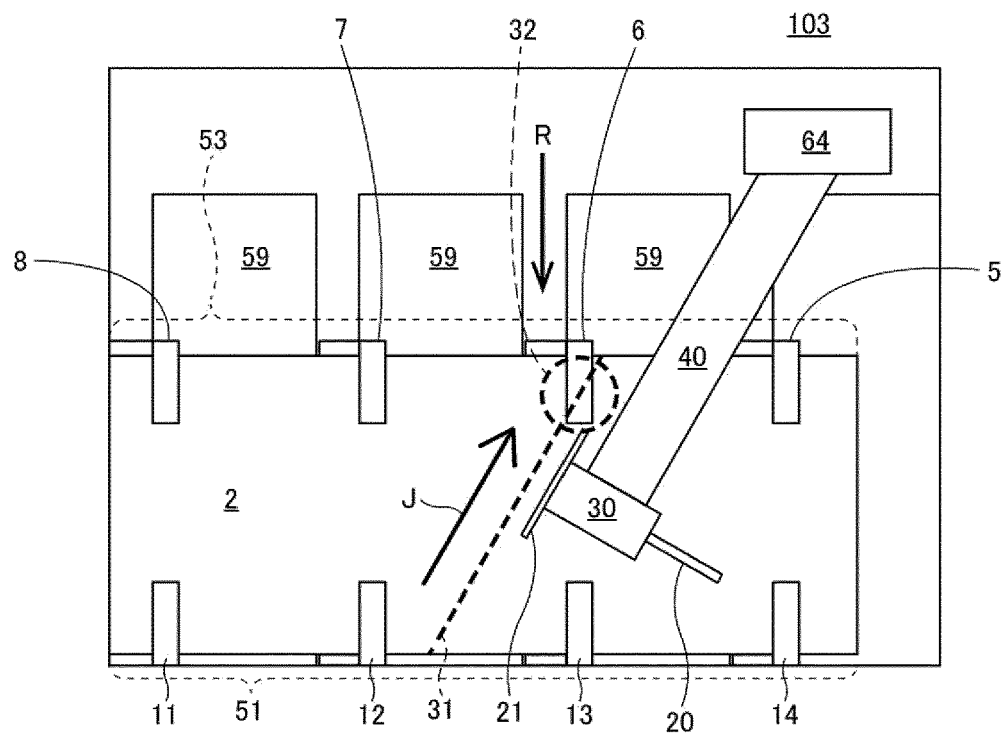
FIG. 9 is a view for explaining an effect and operation of clampers of FIG. 7.
Figure 9:
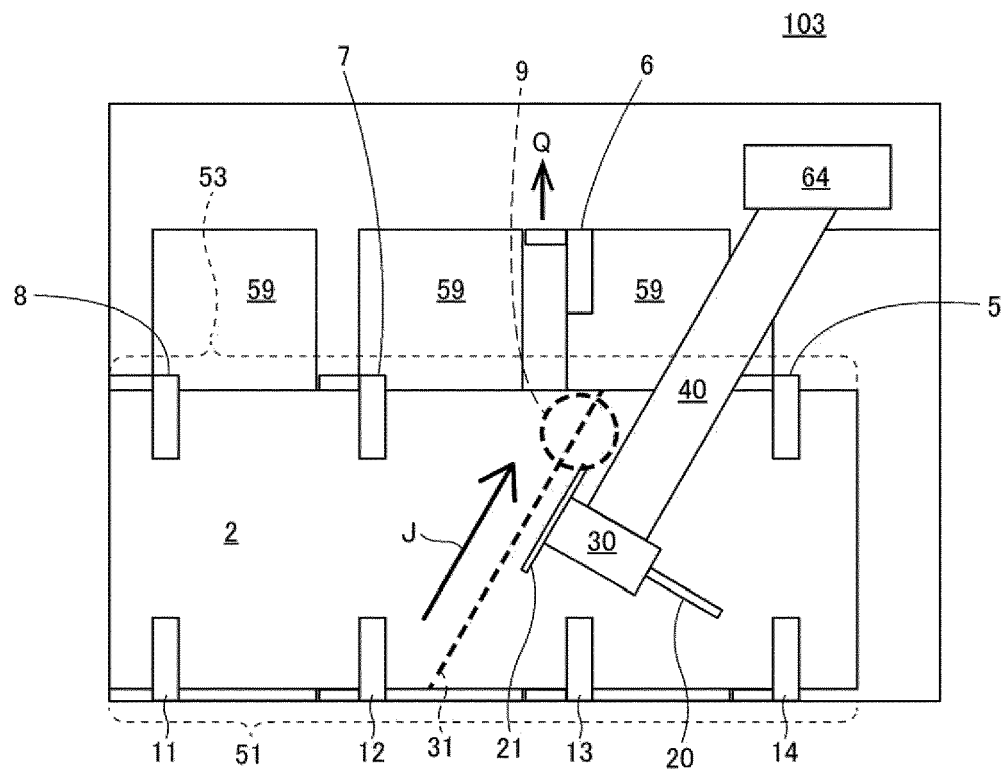

Next, explaining about this system 103 with higher practicality using FIGS. 7 to 12. In addition, it is abbreviating the explanation by giving an identical reference number to a member or part with identical effect and already explained in this system 100 and 101 (FIGS. 1 to 6). FIG. 7 is a perspective view illustrating a modified example of this system capable of operating clampers to avoid malfunction to collide with a cutting means, by adopting the clampers movable in a defined horizontal direction. FIG. 8 is a perspective view for explaining an operation of the clampers of FIG. 7 avoiding a collision by moving in the defined horizontal direction. FIG. 9 is a view for explaining an effect and operation of the clampers of FIG. 7, and FIG. 9A is a plan view illustrating a state before avoidance, and FIG. 9B is a plan view illustrating a state during avoidance.

As illustrated in FIGS. 7 to 12, this system 103 comprises four clampers 11 to 14 arranged at equal intervals along outer periphery 51 of a workpiece-receiving table 59, and four clampers 5 to 8 arranged at equal intervals along outer periphery 53, which is an opposite side of outer periphery 51. In the workpiece-receiving table 59, the clampers 11 to 14 can grasp or release a building material 2 by open and close operation in vertical direction, but the clampers 11 to 14 cannot move in horizontal direction with respect to the workpiece-receiving table 59. In this point, the clampers 11 to 14 are having an identical function as the clampers 11 to 18 described using FIGS. 1 and 2.

In addition, the workpiece-receiving table 59 brings strange feeling for calling it a table, and it is not limited to be configured only by flat surface. In other words, the workpiece-receiving table 59 is having an appearance shape such that it is excavated at approximately equal intervals with respect to longitudinal direction, and parallel four grooves 41 to 44 enables movement in width direction. A flat surface-forming member for the workpiece-receiving table 59 is separated by four grooves 41 to 44 and assembled, above the rigid members 65 and 66 (FIGS. 2 to 4). In addition, the building material 2 itself is having a flat surface with certain extent of rigidity, so a surface of the workpiece-receiving table 59 is not necessary to be a flat surface continuing over entire surface, and it is sufficient if a flat surface is formed as a whole by a combination of steel materials or the like with flat surface.

The clampers 11 to 14 are not movable in horizontal direction with respect to the workpiece-receiving table 59, so it is necessary for the cutting means 30 to perform an operation for avoiding collision mainly. However, there is a case that a contact or collision of the clampers 11 to 14 and the cutting means 30 can be avoided by operating one clamper to which the cutting means 30 is approaching to open in vertical direction, among plural clampers 11 to 14. Also, in this case, a malfunction will not occur to a fixing function, for example, if three clampers are closed and maintaining a state to grasp the building material 2, among plural clampers 11 to 14.

In this system 103, there are three points different from this system 100 and 101. At first, clampers 5 and 8 are arranged at corners 57 and 58 of other side 53 of the workpiece-receiving table 59. Secondly, clampers 5 to 8 are movable in horizontal direction with respect to the workpiece-receiving table 59. Thirdly, the control unit 80 controls the entire system to operate the cutting means 30 to cut and process the building material 2, while operating the clampers 11 to 14, 5 to 8 to avoid contact with the cutting means 30.

As illustrated in FIG. 7, in this system 103, the clampers 5 to 8 are capable of moving horizontally in an arrow R direction to fit width of the building material 2. In addition, as illustrated in FIGS. 8, 9(A) and 9(B), in this system 103, when the cutting means 30 approaches and nearly interferes with the clampers 5 to 8, the clampers 5 to 8 release the grasped building material 2 and operate to move back in an arrow Q direction moving away from the building material 2.

As a result, it is possible to avoid an accident to damage each other by a contact between the cutting means 30 and the clampers 5 to 8. Such contact avoiding operation can be achieved by the control means 80, which always comprehends a mutual position relation of the cutting means 30 and the clampers 5 to 8, and which controls any one (clamper 6 in FIG. 9) of the clampers 5 to 8 to retract accordingly. In addition, when the contact avoiding operation becomes unnecessary, the clamper operates to return in arrow R direction.

In more detail, as illustrated in FIG. 9 (A), explaining using an example that the circular saw 21 will cut the building material 2 in arrow J direction along a cutting line 31. In this case, there is a dangerous region 32 where the circular saw 21 interferes with the clamper 6 near an end of the cutting line 31, so it is necessary to take some avoiding action.

Here, as illustrated in FIG. 9 (B), the control unit 80 always comprehends the mutual position relation between the cutting means 30 and the clampers 5 to 8, and when the dangerous region 32 arises, the control unit 80 controls the clamper 6 to retract accordingly to change it to a safety region 9. At this time, the air cylinder 49 drives the clampers 11 to 18, 5 to 8 to operate to open and close or to move in horizontal direction, by performing predetermined strokes of linear operation, according to distinction of pressing-in and discharge of the compressed air, according to the control of the control unit 80.

In this way, in this system 100, 101 (FIGS. 1 to 6), and 103 (FIGS. 7 to 12), the control unit 80 controls the cutting means 30 to cut and process the building material 1 while controlling at least one of the cutting means 30 and the clampers 11 to 18, 5 to 8 to avoid contact between the cutting means 30 and the clampers 11 to 18, 5 to 8. Therefore, especially, the clampers 5 to 8 (FIGS. 7 to 12) are configured not only to selectively operate to fix or to release the building material 2, but also to be movable in horizontal direction, with respect to the workpiece-receiving table 59 by the control of the control unit 80.

Figure 10:
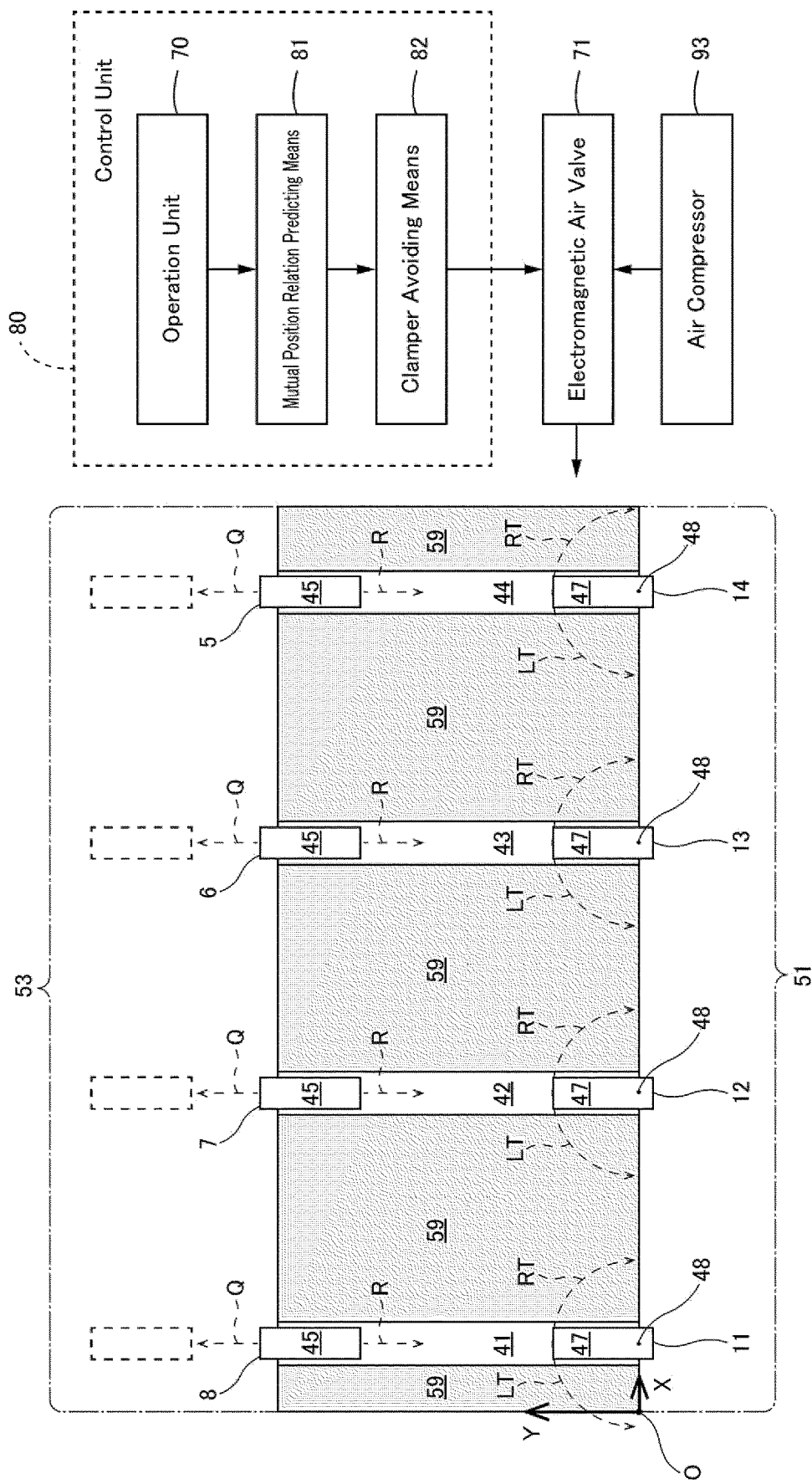
FIG. 10 is a plan view illustrating an arrangement of clampers in a workpiece-receiving table and a movable range of clampers.

FIG. 10 is a plan view illustrating an arrangement of clampers in a workpiece-receiving table and a movable range of the clampers. As illustrated in FIG. 10, eight clampers 11 to 14, 5 to 8 in total are arranged at approximately equal intervals along sides 51 and 53 of outer periphery of the workpiece-receiving table 59. Especially, the clampers 5 to 8 are slidable in horizontal direction along four grooves 41 to 44. These clampers 11 to 14, 5 to 8 are configured to comprise: a pressing crossarm 45, 47 for pressing the building material 1 to the workpiece-receiving table 59 from the above; a laterally pressing pad 46 (FIG. 11) for enclosing and pressing the building material 1 in horizontal direction; and an air cylinder for driving each of the pressing crossarm 45, 47 and the laterally pressing pad 46.

The building material 1 can be fixed on a surface of the workpiece-receiving table 59 by the clampers 11 to 14, 5 to 8, from a board in the size of approximately entire contour of the workpiece-receiving table 59 to a column material protruding from the work-receiving material 59 in a longitudinal direction. In addition, either in the case of large board or thin column material, one side of the building material 1 is fixed at a position pulled to one side 51 of outer periphery of the workpiece-receiving table 59. Therefore, the clampers 5 to 8 are moved in horizontal direction along the grooves 41 to 44, which support each clamper, to be adapted to a width of these building materials 1.

In addition, when it is predicted that the cutting means 30 such as circular saw 21 will contact a clamper, the clampers 11 to 14, 5 to 8 will perform an avoiding movement as the below. At first, the clampers 11 to 14 arranged along one side 51 of outer periphery of the workpiece-receiving table 59 perform the avoiding movement by rotation of the pressing crossarm 47 around a vertical axis 48, wherein the rotatable pressing crossarm 47 mainly presses the building material 1 to the workpiece-receiving table 59 from the above.

In addition, the clampers 5 to 8 arranged along other side 53 of outer periphery of the workpiece-receiving table 59 perform the avoiding movement by horizontal movement of the pressing crossarm 45 along four grooves 41 to 44, wherein the pressing crossarm 45 mainly presses the building material 1 to the workpiece-receiving table 59 from the above. In each of these clampers 11 to 14, 5 to 8, the laterally pressing pad 46 (FIG. 11) for pressing the building material 1 in horizontal direction is also arranged, and these laterally pressing pad 46 also operate to retract accordingly.

In this system 103, the control unit 80 comprises a program for exerting a function of the mutual position relation predicting means 81 and the clamper avoiding means 82, in addition to a function for achieving a content of operation from the operation unit 70. The mutual position relation predicting means 81 predicts a mutual position relation between the cutting means 30 and the clampers 11 to 14, 5 to 8. The mutual position relation is predicted by performing a prescribed calculation based on a size of the building material 1, a fixed position of the building material 1, a shape of the clampers 11 to 14, 5 to 8 for fixing the building material 1 and each posture of the clampers 11 to 14, 5 to 8, and a cutting path by the cutting means 30 such as the circular saw 21.

The clamper avoiding means 82 controls the electromagnetic air valve 71 such that unillustrated air cylinder will perform an avoiding operation and a returning operation of the clampers 11 to 14, 5 to 8 based on a calculation result of the mutual position relation predicting means 81. The control unit 80 achieves its purpose by controlling to open and close the electromagnetic air valve 71 inserted between the air compressor 93 and the air cylinder (unillustrated).

The avoiding operation is an operation of a clamper, only which is predicted to contact the cutting means 30, among the clampers 11 to 14, 5 to 8 plurally arranged on the workpiece-receiving table 59, to avoid contact with the cutting means 30. The returning operation is an operation to return the clamper after the avoiding operation to be able to fix the building material 1, from the clamper that the avoiding purpose has been ended.

In this system 103, the clampers 5 to 8, 11 to 14 comprises the pressing crossarm 47 capable of operating to rotate with respect to the vertical axis 48, and also, movable in horizontal direction with respect to the workpiece-receiving table 59 by control of the control unit 80, and the control unit 80 controls entire system to cut and process the building material 1 while operating the clampers 5 to 8, 11 to 14 to avoid contact with the cutting means 30.

Figure 11:
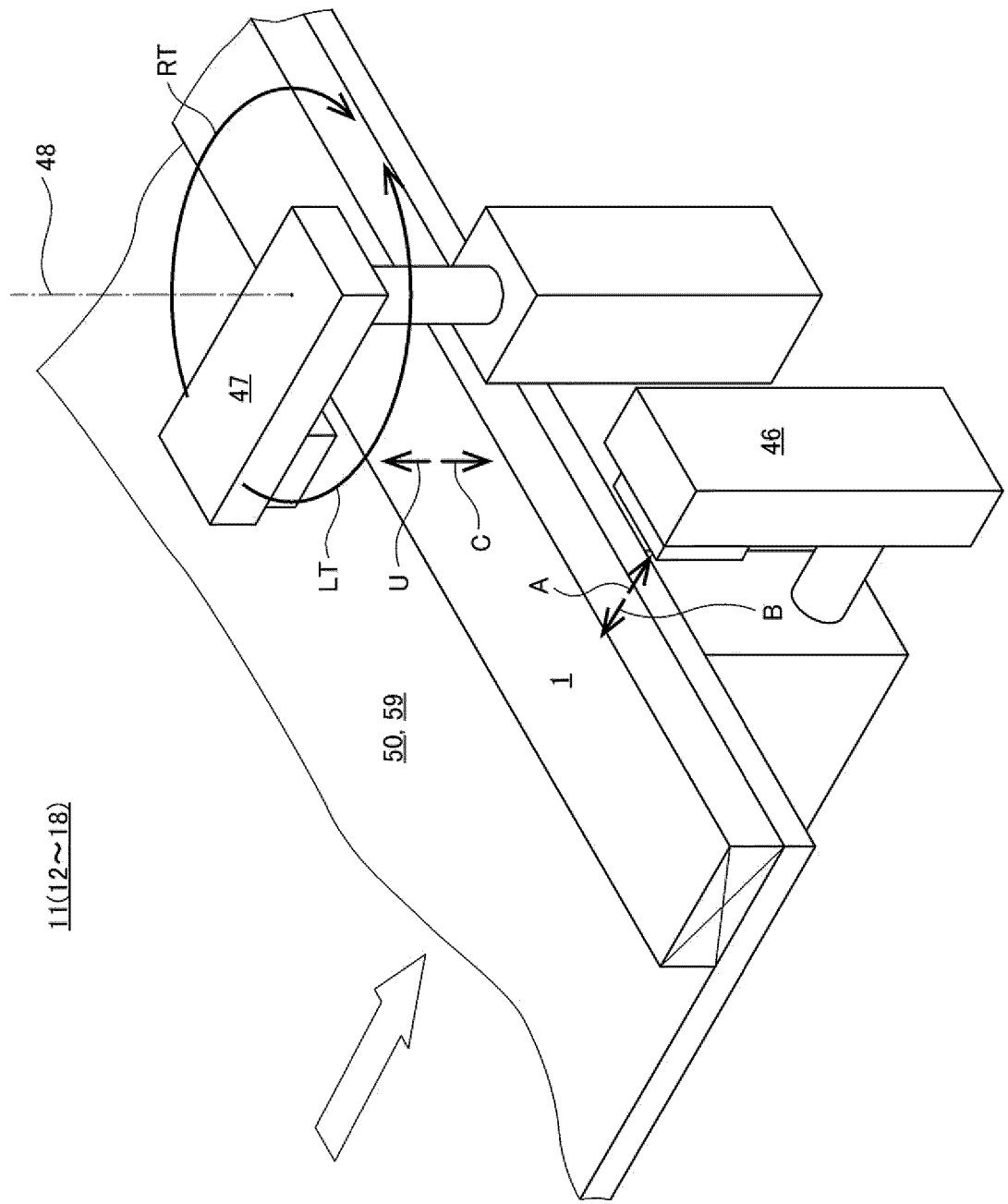
FIG. 11 is an enlarged perspective view for explaining an operation of a clamper.

FIG. 11 is an enlarged perspective view for explaining an operation of a clamper. As illustrated in FIG. 11, the clamper 11 (12 to 14, 5 to 8) comprises the pressing crossarm 45, 47 capable of avoiding malfunction that the cutting means 30 such as the circular saw 21 contacts the clamper 11 to damage each other. This pressing crossarm 45, 47 is having at least either avoiding function, which is capable of operating to rotate with respect to the vertical axis 48, or capable of moving in horizontal direction, with respect to the workpiece-receiving table 59. This avoiding function is performed by control of the control unit 80. In addition, the clamper 11 is exemplifying a clamper, which can be used preferably, especially in this system 103 of FIGS. 7 to 10. The clamper 11 comprises the pressing crossarm 47 capable of avoiding the above malfunction.

The pressing crossarm 47 is capable of rising and falling operation as illustrated by arrows U, C, and capable of rotating operation as illustrated by arrows RT, LT. The laterally pressing pad 46 is also capable of moving in horizontal direction as illustrated by arrows A, B. These pressing crossarm 47 and laterally pressing pad 46 fix the building material 1 to the workpiece-receiving table 59 after receiving the building material 1 in a state illustrated in FIG. 11. In addition, they release the building material 1 by an operation in opposite direction thereof. In addition, as illustrated by arrows A, B, the laterally pressing pad 46 of FIG. 11 is capable of slight horizontal movement, but it does not move largely as the entire clamper 6 capable of horizontal movement in R direction as illustrated in FIGS. 8 to 10, 12.

Here, the pressing crossarm 47 releases a restraint of the building material 1 by rising and rotates to a direction along avoiding purpose, when it is predicted to contact the cutting means 30. Similarly, the laterally pressing pad 46 is also able to achieve avoiding purpose by moving in adverse direction to a direction pressing the building material 1 in horizontal direction, in other words in horizontal direction to release the building material 1, when it is predicted to contact the cutting means 30.

Figure 12:
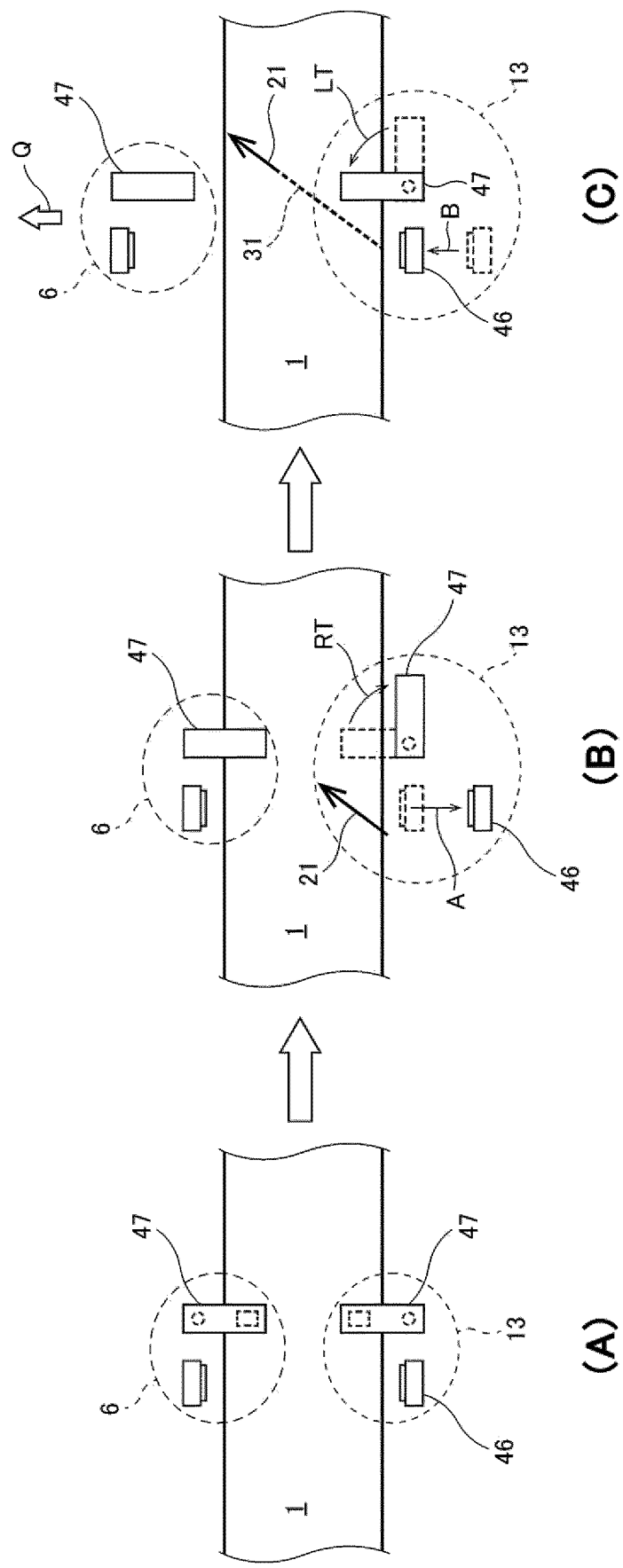
FIG. 12 is a view for explaining avoiding operation of clampers.
Figure 14:
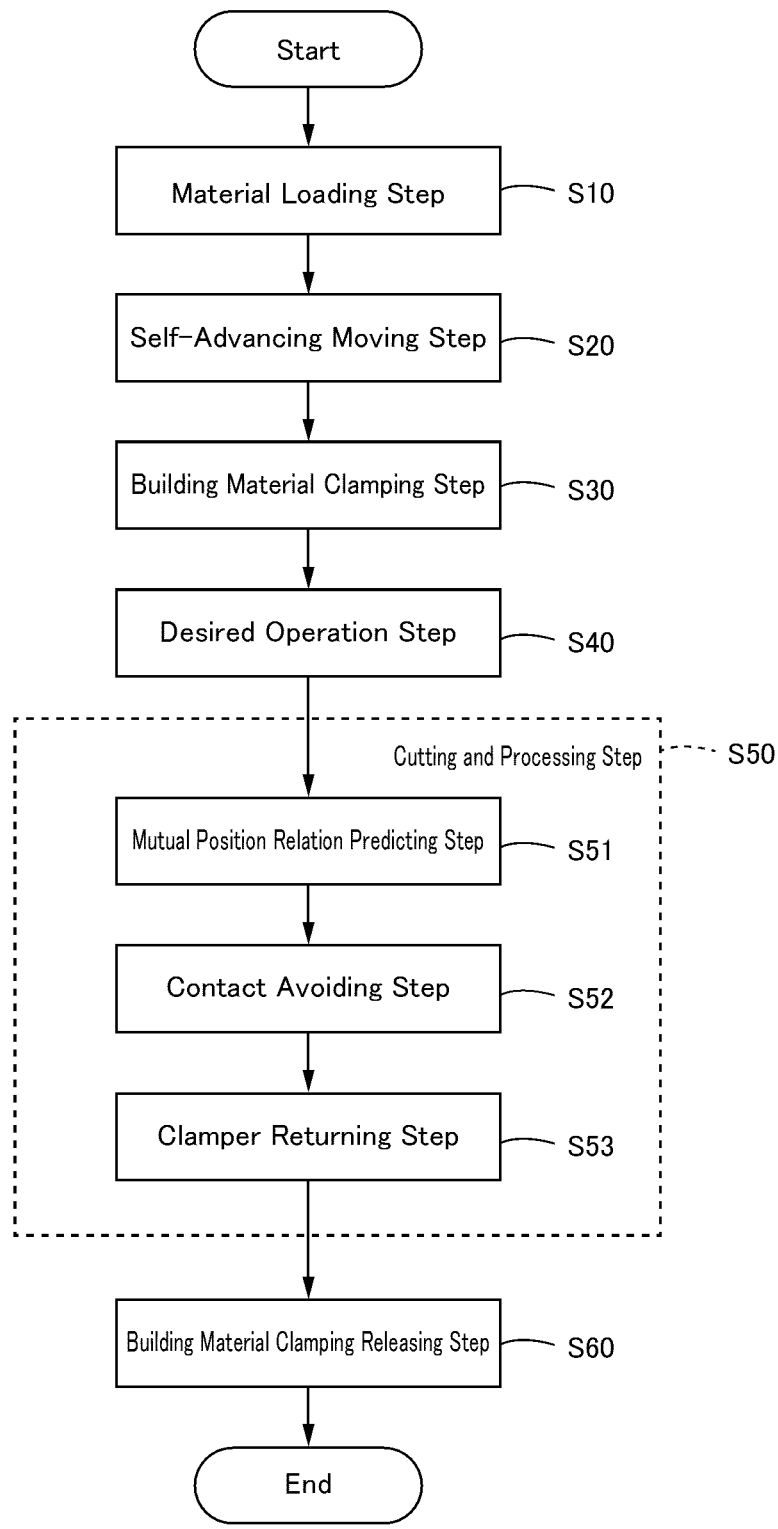
FIG. 14 is a flow chart for explaining an outline of a building material processing method relating to one embodiment of the present invention (Hereinafter, referred to as "this method").

FIG. 12 is a view for explaining avoiding operation of clampers, and FIG. 12A is a schematic plan view illustrating a building material clamping step (S30 of FIG. 14), and FIG. 12B is a schematic plan view illustrating a beginning of a cutting and processing step (S51 of FIG. 14), and FIG. 12C is a schematic plan view illustrating an end of a cutting and processing step (S51 to S53 of FIG. 14). In addition, this FIG. 12 is a drawing simplified for schematically explaining about the avoiding operation by closing up only to main points, by limiting only to the clampers 6, 13, but the avoiding operation of the laterally pressing pad 46 is added with respect to the explanation used in FIG. 9.

As illustrated in FIG. 12A, in the building material clamping step (S30 of FIG. 14), the pressing crossarm 47 presses the building material 1 to the workpiece-receiving table 59 from the above by an angle orthogonal to a longitudinal direction of the building material 1, and also, the laterally pressing pad 46 encloses and presses the building material 1 in horizontal direction. Then, as illustrated in FIG. 12B, in the beginning of cutting and processing step, it is necessary to take some kind of avoiding action, based on a prediction that the circular saw 21 will contact the laterally pressing pad 46 of the clamper 13 (mutual position relation predicting step S51 of FIG. 14). As this avoiding action, the laterally pressing pad 46 moves in adverse direction to a direction pressing the building material 1 in horizontal direction, in other words in horizontal direction to release the building material 1, and also, the pressing crossarm 47 releases a restraint of the building material 1 by rising and rotates to right direction RT along avoiding purpose.

Then, as illustrated in FIG. 12C, in the end of the cutting and processing step, the clamper 13 is operated to return to be able to fix the building material 1 (clamper returning step S53 of FIG. 14), from the clamper 13 that a purpose of avoiding a risk that the circular saw 21 will contact the pressing crossarm 47 and the laterally pressing pad 46 has been ended. On the other hand, with respect to the clamper 6, the pressing crossarm 47 and the laterally pressing pad 46 are operated to avoid to a direction along avoiding purpose, based on a prediction that the circular saw 21 will contact the pressing crossarm 47 and the laterally pressing pad 46 of the clamper 6 (mutual position relation predicting step S51 of FIG. 14). Finally, it is omitted from FIG. 12, but the clamper 6 is also operated to return to be able to fix the building material 1 (clamper returning step S53 of FIG. 14), from the clamper 6 that the purpose of avoiding the risk has been ended, following the clamper 13.

Figure 13:
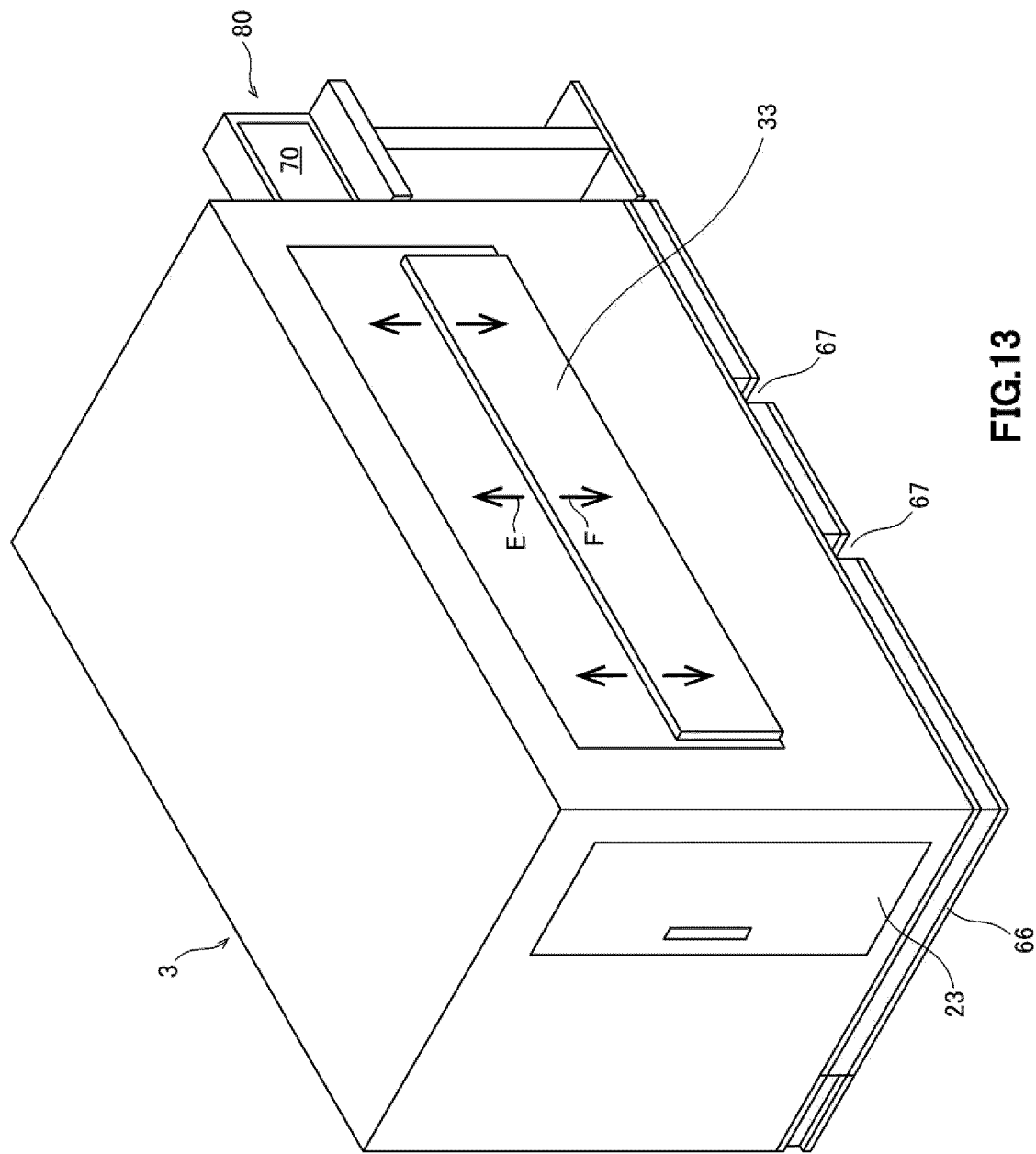
FIG. 13 is a perspective view illustrating an acrylic cover of this system.

FIG. 13 is a perspective view illustrating an acrylic cover of this system. As illustrated in FIG. 13, this system 100, 101 and 103 is preferable to comprise an acrylic cover 3 for preventing a scattering of sawdust and else generated from proximity of the cutting means 30. This acrylic cover 3 is having a contour and shape to cover at least the workpiece-receiving table 59, the multi joint robot 40, and the cutting means 30, without interfering an operation of cutting and processing, and also, it is fixedly arranged to a base having the rigid members 65 (FIGS. 2, 4), 66.

This acrylic cover 3 comprises a window 33 and an inspection door 23. The window 33 is able to put in and out the building material 1, 2 by automatically opening and closing the window 33 accordingly according to a progress of the work. In other words, the window 33 opens by lifting the window 33 in arrow E direction, and closes by dropping the window 33 in arrow F direction, by a driving force of unillustrated air cylinder or the like. The inspection door 23 is a door capable of opening and closing, through which a person for maintenance can enter and exit accordingly.

In the below, explaining about this method. This method is a building material processing method for cutting and processing a building material 1 to be used on construction site at construction site by this system 100. As mentioned above, this system 100 used in this method is a system made to be movable by loading a workpiece-receiving table 59 for fixing a building material 1, a multi joint robot 40, a cutting means 30, and a control unit 80 for controlling these members on a cargo bed 60 of a movable vehicle 90 for processing the building material 1 on construction site.

The workpiece-receiving table 59 ensures flatness by rigid members 65, 66 arranged at predetermined section of the cargo bed 60 composing the vehicle 90. The multi joint robot 40 is provided with freely swingable cutting means 30 at its tip. The cutting means 30 is freely swingable and capable of protruding from outer periphery of the workpiece-receiving table 59. The building material 1 fixed to the workpiece-receiving table 59 is cut and processed freely by this cutting means 30.

The control unit 80 controls the multi joint robot 40 and the cutting means 30 to cut and process the building material 1 according to desired processing specification, based on a program performed in relation to an operation by an operation unit 70. At this time, the control unit 80 controls the multi joint robot 40 such that the cutting means 30 will cut and process the building material 1 fixed to the workpiece-receiving table 59 by clampers 11 to 18 while avoiding contact with the clampers 11 to 18. Hereinafter, explaining about the detailed procedure using FIG. 14.

FIG. 14 is a flow chart for explaining an outline of this method. As illustrated in FIG. 14, this method comprises a material loading step (S10), a self-advancing moving step (S20), a building material clamping step (S30), a desired operation step (S40), a cutting and processing step (S50), and a building material clamping releasing step (S60).

In the material loading step (S10), building materials 1 before processing and to be used on construction site are loaded on a storage place 10 for material before processing arranged at backward side of the cargo bed 60. Then, in the self-advancing moving step (S20), it will move by self-travelling to construction site by the vehicle 90 in fully loaded state after the material loading step (S10). Then, in the building material clamping step (S30), the loaded building material 1 before processing is moved to the workpiece-receiving table 59 in order of use for assembly, and fixed by the clampers 11 to 18.

In the desired operation step (S40), a user operates the operation unit 70 to make the multi joint robot 40 to cut and process the building material 1 desirably based on processing specification. In the cutting and processing step (S50), the cutting means 30 cut and process the building material 1 fixed to the workpiece-receiving table 59 while avoiding contact with the clampers 11 to 18, by the control unit 80 controlling the multi joint robot 40 according to the operation of the user. In the building material clamping releasing step (S60), the clampers 11 to 18 are released and the building material 1 cut and processed desirably is removed from the workpiece-receiving table 59.

In addition, the cutting and processing step (S50) comprises a mutual position relation predicting step (S51), a contact avoiding step (S52), and a clamper returning step (S53). In the mutual position relation predicting step (S51), the mutual position relation between the cutting means 30 and the clampers 11 to 14, 5 to 8 is predicted by a mutual position relation predicting means 81 based on a behavior of the cutting means 30 according to desired cutting and processing. In the contact avoiding step (S52), among plural clampers 11 to 14, 5 to 8, a clamper which has been predicted to contact the cutting means 30 will be operated to avoid the cutting means 30, according to a prediction result by the mutual position relation predicting step (S51). In the clamper returning step (S53), the clamper which has been operated to avoid the cutting means 30 in the contact avoiding step (S52) will be operated to return to be able to fix the building material 1 from the clamper that avoiding purpose has been ended.

As explained in the above, it is possible to provide an in-vehicle building material processing system and a building material processing method for cutting and processing the building material to be used on construction site at the construction site easily. In other word, in this system, there is no malfunction that the cutting means contacts the clampers to damage each other, so attention for avoiding this malfunction will not be necessary. In addition, in this method, it would be easy to standardize an operation of multi-phase steps for cutting and processing on construction site, and not in factory, so it will be possible to utilize even non-skilled workers more efficiently. Therefore, according to the present invention, it is possible to cut and process easily on construction site, and not in factory, even there are no or only few skilled workers.

Ground Installed Type by Unloading From Vehicle

In the below, as a modified example, explaining about a case that this system 100, 101 is used by installing it on ground as fixed equipment, by releasing this system 100, 101 from in-vehicle state. This system 100, 101 is provided with a building material processing robot system configured as a unit, and mounted on the cargo bed 60 of the vehicle 90, 99. Its purpose is to perform a mobile visit service to a developing region where woodwork equipment is not fully equipped.

As a practical configuration matching this purpose, a configuration to release this system 100, 101 from in-vehicle state, and to utilize it by installing on ground as fixed equipment may be possible. On the other hand, if the building material processing robot system configured as a unit is put down from the cargo bed 60 of the vehicle 90, 99, the cargo bed 60 will be empty and it can be used as a purpose for transporting other goods, so facility efficiency will be improved. In addition, after end of purpose of the visit service, this system 100, 101 may be put back to in-vehicle state and may be removed.

This system 100, 101 mounts the building material processing robot system compactly configured as a unit, on a base having rigid members 65, 66 for reinforcing and ensuring its flatness, on cargo bed 60 of the vehicle 90, 99. With respect to the cargo bed 60, in order to unload its unit, it is preferable that a function of palette adapting to a forklift is formed by the base having rigid members 65, 66. In addition, the cargo bed 60 and the rigid members 65, 66 are connected or disconnected accordingly by unillustrated bolt and nut.

The above palette is a plate-like carrying frame used in distribution operation such as transportation or storage, and there are palette made of resin, wood, or metal. The palette has insertion ports 67 for inserting claws of unillustrated forklift or hand lift, for performing loading into truck and transportation in a yard efficiently. In addition, for many palettes, allowed dynamic load is about one ton. In addition, dynamic load is a durable weight in a state moved by the forklift or the like, and static load is a durable weight when placed on a flatland and it is larger than one ton of dynamic load.

In this system 100, 101, a weight (static load) of the building material processing robot system configured as a unit on the cargo bed 60 is also approximately one ton. It is easy to form a function of palette corresponding to this weight by the base having the rigid members 65, 66. Therefore, about a case that this system 100, 101 is released from the in-vehicle state to use it by installing on ground as fixed equipment, it is possible to unload the unit by one standard forklift with lifting ability more than one ton, without a crane. In addition, when crane hook is to be hooked, it is more preferable that unillustrated hanging rings are arranged at four corners of the rigid members 65, 66.

In addition, in the palette, there are two-way inserting type and four-way inserting type according to difference of number of insertion ports for the claws of the lift. In two-way inserting type, there are sides without the insertion port. In four-way inserting type, there are inserting ports at every four sides of resin palette, so it is possible to insert the forklift from anywhere to lift it up. About this point, it may be optimally designed according to configuration of practical operation.

The present invention may be adopted to a step for processing building material in relatively simple residential construction such as "two by four construction method". Especially, from the perspective of human resources and facilities, it may be adopted advantageously according to regional circumstances with high demand for easily achieving cutting and processing on construction site, not in factory, even there are no or only few skilled workers.

This system is having an advantage that it is possible to cope with every processing of building material by one system, even there is little decrease in efficiency compared to exclusive processing machine. Therefore, it is preferable for application to start small-scale housing construction business using this system in undeveloped regions without building material processing factory equipped with plurality of high efficiency exclusive processing machines for each processing content. If housing construction business develops to large scale at this region, more efficient building material processing factory may be constructed. In other words, the present invention may be adopted suitably in a developing region even for an experimental purpose.

In addition, we have explained in detail about each embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the in-vehicle building material processing system are also not limited to those explained in each embodiment and each example of the present invention and it can be performed with various modifications.

GLOSSARY OF DRAWING REFERENCES

1, 2 Building material
3 Acrylic cover
5 to 8 (Movable) Clamper
9 Safety region
10 Storage place for material before processing
11 to 18 (Fixed Position) Clamper
19 Cushion
20 Rotation axis
21 Circular saw
23 Inspection door (of acrylic cover)
30 Cutting means
31 Cutting line
32 Dangerous region
33 Automatically opening and closing window (of acrylic cover)
40 Multi-joint robot
41 to 44 Table separating groove
46 Laterally-pressing pad (of clamper)
45, 47 Pressing crossarm (of clamper)
48 Vertical axis (of clamper)
49 Air cylinder (for clamper)
50, 59 Workpiece-receiving table
51 to 54 Side of outer periphery (of workpiece-receiving table)
55 to 58 Corner (of workpiece-receiving table)
60 Cargo bed
61 Floor (of cargo bed)
62 Rail
64 Carrier
65, 66 Rigid member
67 Insertion ports (for claws of lift)
69 Ceiling
70 Operation unit (robot control panel)
71 Electromagnetic air valve
79 Governor
80 Control unit
81 Mutual position relation predicting means
82 Clamper avoiding means
90 Vehicle
91, 94 Power generator
92 Dust collector
93 Air compressor
95 Power transmission means
96 Engine
97 Power generator drive shaft
98 Vehicle drive shaft
99 Exclusive vehicle
100, 101, 103 In-vehicle building material processing system (this system)

D Width (of workpiece-receiving table)
H Height (Z axis) (of floor of cargo bed to ceiling)
K Length (of workpiece-receiving table)
L Entire length (of cargo bed)
M Length (X axis)
N Total number of clampers (11 to 18)
O Reference point
A, B, E, F, J, P, Q, R, RT, LT Arrow
S10 Material loading step
S20 Self-advancing moving step
S30 Building material clamping step
S40 Desired operation step
S50 Cutting and processing step
S60 Building material clamping releasing step
V Length (Y axis)
W Entire width (of cargo bed)
X, Y, Z Three-dimensional coordinate axis

The invention claimed is:

1. A movable in-vehicle building material processing system having a function to cut and process a building material to be used on a construction site, the in-vehicle building material processing system comprising:
   a flat cargo bed formed on a vehicle;
   a plurality of rigid members configured to maintain flatness with respect to a workpiece-receiving table formed at a predetermined section of the cargo bed;
   a plurality of clampers configured to fix the building material on the workpiece-receiving table;
   a multi-joint robot provided with a freely swingable cutting means at a tip of the multi-joint robot, the cutting means being configured to protrude in a range wider than an outer periphery of the workpiece-receiving table; and
   a control unit configured to control the entire in-vehicle building material processing system having an operation unit that causes the multi-joint robot to cut and process the building material, the control unit controls the cutting means to cut and process the building material while controlling at least either of the cutting means and the plurality of clampers to avoid contact of the cutting means and the plurality of clampers,
   wherein:
   the plurality of clampers include a pressing cross-arm having an avoiding function, which at least either (i) operates to rotate around a vertical axis, or (ii) moves in a horizontal direction, with respect to the workpiece-receiving table by control of the control unit, in order to avoid contact of the cutting means and the plurality of clampers; and
   the control unit includes:
      a mutual position relation predicting means configured to calculate a mutual position relation between the cutting means and the plurality of clampers, and
      a clamper avoiding means configured to operate only one clamper, which is predicted to contact the cutting means, to avoid the cutting means, among the plurality of clampers arranged on the workpiece-receiving table, and the clamper avoiding means is configured to operate the one clamper to return to fix the building material, when operating the one clamper to avoid the cutting means has been ended, based on the calculated mutual position relation between the cutting means and the one clamper.

2. The in-vehicle building material processing system according to claim 1, wherein a total number N of the plurality of clampers is N=8.

3. The in-vehicle building material processing system according to claim 1, further comprising:
   an air cylinder configured to drive an open and close operation or a moving operation of the plurality of clampers;
   an air compressor configured to apply compressed air to the air cylinder; and
   an electromagnetic air valve configured to press the compressed air generated by the air compressor into the air cylinder based on an operation of the operation unit.

4. The in-vehicle building material processing system according to claim 3, further comprising:
   a plurality of rails extending adjacent to the workpiece-receiving table; and
   a carrier configured to move the multi-joint robot by engaging with the plurality of rails,
   wherein the control unit is configured to control the cutting means and the multi-joint robot together with the carrier.

5. The in-vehicle building material processing system according to claim 4, wherein:
   the vehicle includes:
      a power generator configured to supply electric power necessary for the in-vehicle building material processing system; and
      a dust collector configured to collect cutting chips,
   the power generator and the air compressor are loaded at a forward side of the cargo bed and in front of the workpiece-receiving table,
   the workpiece-receiving table is formed at an intermediate position of a longitudinal direction of the cargo bed, and
   a storage place for material before processing is arranged at a backward side of the cargo bed.

6. The in-vehicle building material processing system according to claim 3, wherein:
   the vehicle includes:
      a power generator configured to supply electric power necessary for the in-vehicle building material processing system; and
      a dust collector configured to collect cutting chips,
   the power generator and the air compressor are loaded at a forward side of the cargo bed and in front of the workpiece-receiving table,
   the workpiece-receiving table is formed at an intermediate position of a longitudinal direction of the cargo bed, and
   a storage place for material before processing is arranged at a backward side of the cargo bed.

7. The in-vehicle building material processing system according to claim 6, wherein the power generator includes a power transmission means driven by concurrently using a power of an engine used for a movement of the vehicle.

8. A building material processing method for cutting and processing a building material to be used on a construction site by loading a multi-joint robot provided with a freely swingable cutting means at a tip of the multi-joint robot onto a vehicle, using:
   a workpiece-receiving table maintaining flatness by a plurality of rigid members arranged at a predetermined section of a cargo bed composing the vehicle;
   the multi-joint robot provided with the freely swingable cutting means at the tip, the cutting means being configured to protrude in a range wider than an outer periphery of the workpiece-receiving table; and a control unit configured to control an entire in-vehicle building material processing entire system having an operation unit that causes the multi-joint robot to cut and process the building material, wherein the building material fixed on the workpiece-receiving table by a plurality of clampers is cut and processed by the cutting means while at least either of the cutting means and the plurality of clampers is operated to avoid a contact of the cutting means and the plurality of clampers, with an aid of the control unit, the building material processing method comprising:
- a material loading step of loading building materials, before processing and to be used on the construction site, on a storage place for material arranged at a backward side of the cargo bed;
- a self-advancing moving step of moving the vehicle in a fully equipped condition to the construction site by self-driving;
- a building material clamping step of fixing the loaded building material before processing by the plurality of clampers, by moving the building material to the workpiece-receiving table in an order of use for assembly;
- an operation step, in which a user operates the operation unit for performing a cutting and processing of the building material by the multi-joint robot;
- a cutting and processing step of cutting and processing the building material by the cutting means while the plurality of clampers operate to avoid a contact with the cutting means, by controlling the system by the control unit according to an operation of the user, the cutting and processing step including:
  - a mutual position relation predicting step of calculating a mutual position relation between the cutting means and the plurality of clampers by a mutual position relation predicting means, based on an operation of the cutting means according to the cutting and processing,
  - a contact avoiding step of operating one clamper, which is calculated to contact the cutting means, to avoid the cutting means, among the plurality of clampers, according to the calculated mutual position relation by the mutual position relation predicting step, and
  - a clamper returning step of operating the one clamper, which has been operated to avoid the cutting means in the contact avoiding step, to return to fix the building material, when operating the one clamper to avoid the cutting means has been ended; and
- a building material clamping releasing step of removing the building material cut and processed from the workpiece-receiving table by releasing the plurality of clampers.

* * * * *